US010271315B2

(12) United States Patent
Takeda et al.

(10) Patent No.: US 10,271,315 B2
(45) Date of Patent: Apr. 23, 2019

(54) USER TERMINAL, RADIO BASE STATION, RADIO COMMUNICATION SYSTEM, AND RADIO COMMUNICATION METHOD

(71) Applicant: NTT DOCOMO, INC., Tokyo (JP)

(72) Inventors: Kazuki Takeda, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/107,474

(22) PCT Filed: Dec. 4, 2014

(86) PCT No.: PCT/JP2014/082139
§ 371 (c)(1),
(2) Date: Jun. 23, 2016

(87) PCT Pub. No.: WO2015/098457
PCT Pub. Date: Jul. 2, 2015

(65) Prior Publication Data
US 2016/0323873 A1 Nov. 3, 2016

(30) Foreign Application Priority Data
Dec. 26, 2013 (JP) .............................. 2013-269757

(51) Int. Cl.
*H04W 72/04* (2009.01)
*H04W 76/15* (2018.01)
(Continued)

(52) U.S. Cl.
CPC ...... *H04W 72/0413* (2013.01); *H04B 7/0632* (2013.01); *H04L 1/0026* (2013.01);
(Continued)

(58) Field of Classification Search
CPC ..... H04W 72/04; H04W 76/02; H04W 72/12; H04L 1/18; H04L 5/00
See application file for complete search history.

(56) References Cited

U.S. PATENT DOCUMENTS 9,924,533 B2 * 3/2018 Tseng ................ H04W 72/1289
2012/0008600 A1 * 1/2012 Marinier ................ H04L 5/001
370/336
(Continued)

FOREIGN PATENT DOCUMENTS

EP 2849359 A1 3/2015
KR 20130125721 A 11/2013

OTHER PUBLICATIONS

International Search Report issued in PCT/JP2014/082139 dated Feb. 24, 2015 (1 page).
(Continued)

*Primary Examiner* — Xavier Szewai Wong
(74) *Attorney, Agent, or Firm* — Osha Liang LLP

(57) ABSTRACT

In order to change PUCCH transmission cells appropriately, the present invention provides a user terminal that communicates with a plurality of cell groups each consisting of one or more cells using different frequency bands, the user terminal comprising: a reception section that receives a radio resource control (RRC) message; and a control section that selects at least one cell from cells that are configured for each of the cell groups and are allocatable with an uplink control signal, and controls the cell to be a cell for transmitting the uplink control signal, wherein when the RRC message includes a change instruction of the cell allocatable with the uplink control signal, the control section controls to transmit transmission acknowledgement information (HARQ-ACK) in response to the RRC message in the cell before change.

4 Claims, 20 Drawing Sheets

(51) Int. Cl.
　　　*H04L 5/00* (2006.01)
　　　*H04L 1/18* (2006.01)
　　　*H04B 7/06* (2006.01)
　　　*H04W 72/12* (2009.01)
　　　*H04L 1/00* (2006.01)
　　　*H04B 7/022* (2017.01)
　　　*H04L 1/16* (2006.01)

(52) U.S. Cl.
　　　CPC ............ *H04L 1/1861* (2013.01); *H04L 5/001* (2013.01); *H04L 5/0041* (2013.01); *H04L 5/0055* (2013.01); *H04W 72/1289* (2013.01); *H04W 76/15* (2018.02); *H04B 7/022* (2013.01); *H04L 1/1671* (2013.01); *H04L 5/0091* (2013.01)

(56) References Cited

U.S. PATENT DOCUMENTS

| | | | | |
|---|---|---|---|---|
| 2012/0039199 A1* | 2/2012 | Chen | ................. | H04L 1/0027 370/252 |
| 2012/0082107 A1* | 4/2012 | Ou | ................. | H04W 74/0833 370/329 |
| 2012/0230238 A1* | 9/2012 | Dalsgaard | ............ | H04L 1/0026 370/311 |
| 2014/0078942 A1* | 3/2014 | Noh | ................. | H04W 72/0413 370/280 |
| 2015/0099501 A1 | 4/2015 | Kim et al. | | |
| 2015/0172030 A1* | 6/2015 | Tiirola | ................. | H04L 1/1854 370/280 |
| 2015/0319754 A1* | 11/2015 | Ishida | .................... | H04L 5/001 370/329 |
| 2016/0037405 A1* | 2/2016 | Choi | .................... | H04W 16/32 455/444 |

OTHER PUBLICATIONS

Witten Opinion of the International Searching Authority issued in PCT/JP2014/082139 dated Feb. 24, 2015 (4 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12)"; Dec. 2014 (251 pages).

Extended European Search Report issued in the counterpart European Patent Application No. 14875290.0, dated Jul. 7, 2017 (11 pages).

NSN, et al.; "On the need of PCell functionality in SeNB"; 3GPP TSG-RAN WG2 Meeting #84, R2-134188; San Francisco, USA, Nov. 11-15, 2013 (4 pages).

* cited by examiner

CA (Carrier Aggregation)

→ (E)PDCCH
--→ PUCCH

DC (Dual Connectivity)

→ (E)PDCCH
--→ PUCCH

USER TERMINAL, RADIO BASE STATION, RADIO COMMUNICATION SYSTEM, AND RADIO COMMUNICATION METHOD

TECHNICAL FIELD

The present invention relates to a user terminal, a radio base station, a radio communication system and a radio communication method in next-generation mobile communication systems.

BACKGROUND ART

In a UMTS (Universal Mobile Telecommunications System) network, for the purposes of further increasing data rates, providing low delay and so on, long-term evolution (LTE) has been standardized (see Non Patent Literature 1)

In LTE, as multi access schemes, OFDMA (Orthogonal Frequency Division Multiple Access) based system is adopted for downlink and SC-FDMA (Single Carrier Frequency Division Multiple Access) based system is adopted for uplink.

For the purpose of achieving further broadbandization and increased speed beyond ETC, successor systems to LTE referred to as, for example, "LTE-advanced" or "LTE enhancement" are under study and the specifications thereof have been drafted as Rel. 10/11.

Also, the system band of the LTE Rel. 10/11 system includes at least one component carrier (CC), where one CC constitutes one unit of the system band of the LTE system. A plurality of CCs are aggregated into a wide band, which is referred to as "carrier aggregation" (CA). In this description, CCs are also simply referred to as "cells."

In another successor system to LTE, LTE Rel. 12, various scenarios are under study in which a plurality of cells use different frequency bands (carriers). When a plurality of radio base stations forming cells are substantially the same, above-described CA can be applied. On the other hand, when the radio base stations forming cells are completely different, dual connectivity (DC) may be applied.

Carrier aggregation (CA) may be called "Intra-eNB CA" and dual connectivity (DC) may be called "Inter-eNB CA".

When DC is used, a user terminal is configured to allocate uplink control information (UCI) to an uplink control channel (PUCCH: Physical Uplink Control Channel) not only in the primary cell (PCell), but also in at least one secondary cell (SCell) and send feedback to the radio base stations.

CITATION LIST

Non Patent Literature

Non-Patent Literature 1: 3GPP TS 36.300 "Evolved Universal Terrestrial Radio Access (E-UTRA) and Evolved Universal Terrestrial Radio Access Network (E-LITRAN); Overall description; Stage 2"

SUMMARY OF THE INVENTION

Technical Problem

A cell transmitting PUCCH is configured by higher layer signaling and may be indicated to be changed in accordance with any later network or traffic situation. However, as to the case where a plurality of cells are configured as PUCCH transmission cell and a PUCCH transmission cell is indicated to be changed, there is no definition for the terminal operation and method.

The present invention was carried out in view of the foregoing and aims to provide a user terminal, a radio base station, a radio communication system and a radio communication method capable of changing PUCCH transmission cells appropriately.

Solution to Problem

The present invention provides a user terminal that communicates with a plurality of cell groups each consisting of one or more cells using different frequency bands, the user terminal comprising: a reception section that receives a radio resource control (RRC) message; and a control section that selects at least one cell from cells that are configured for each of the cell groups and are allocatable with an uplink control signal, and controls the cell to be a cell for transmitting the uplink control signal, wherein when the RRC message includes a change instruction of the cell allocatable with the uplink control signal, the control section controls to transmit transmission acknowledgement information (HARQ-ACK) in response to the RRC message in the cell before change.

Technical Advantage of the Invention

According to the present invention, it is possible to change PUCCH transmission cells appropriately.

DESCRIPTION OF EMBODIMENTS

With reference to the accompanying drawings, embodiments of the present invention will be described in detail below. Note that, when the following description refers to the physical downlink control channel (PDCCH: Physical Downlink Control Channel), this will cover the enhanced physical downlink control channel (EPDCCH: Enhanced PDCCH) as well.

In the LTE-A system, a HetNet (Heterogeneous Network) is under study in which a small cell having a local coverage area of a radius of approximately several-ten meters, is formed within a macro cell having a wide coverage area of a radius of approximately several kilometers. Carrier aggregation (CA) and dual connectivity (DC) are applied to the HetNet structure.

In the HetNet structure, there is considered a scenario where small cells are located densely in order to support further traffic growth. In this scenario, it is preferable to secure coverage by using a carrier of a relatively low frequency band in the macro cell, and secure a wide band by using a carrier of a relatively high frequency band in the small cells.

In the macro cell layer, wide coverage and mobility are secured by establishing a control plane (C (Control)-plane) connection and supporting high transmission power density in a low frequency band. On the other hand, in the dense small cell layer, a user plane (U (User)-plane) connection, which is specifically used for data, is established, so that capacity is secured in a high frequency band and the throughput increases. Note that a small cell may be referred to as a phantom cell, a pico cell, a nano cell, a femto cell, a micro cell and so on.

FIG. 1 provides schematic diagrams of carrier aggregation (CA) and dual connectivity (DC). In the examples illustrated in FIG. 1, a user terminal UE communicates with radio base stations eNB1 and eNB2.

In FIG. 1, control signals are illustrated that are transmitted/received via a physical downlink control channel (PDCCH: Physical Downlink Control Channel) and a physical uplink control channel (PUCCH: Physical Uplink Control Channel), respectively. For example, downlink control information (DCI) is transmitted via the PDCCH. Also, uplink control information (UCI) is transmitted via the PUCCH. Note that the DCI that is transmitted via the PDCCH may be referred to simply as downlink control signals (PDCCH signals), and the UCI that is transmitted via the PUCCH may be referred to simply as uplink control signals (PUCCH signals).

Figure 1A:
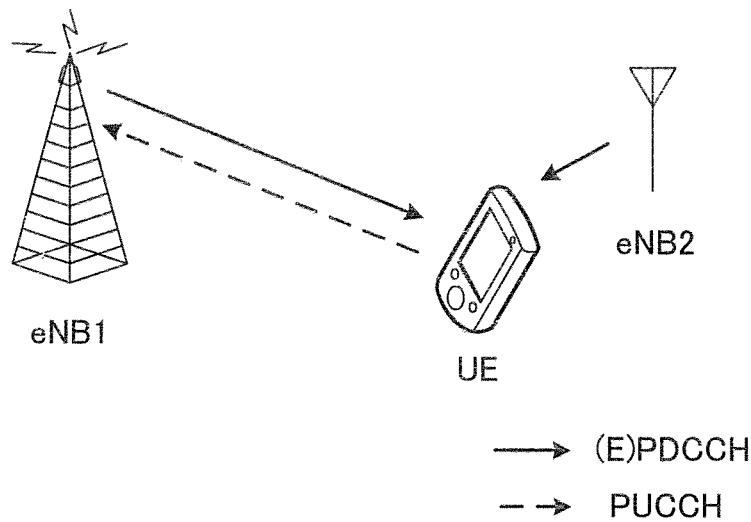
FIG. 1 provides diagrams illustrating carrier aggregation (CA) and dual connectivity (DC)

FIG. 1A illustrates CA applied to communication between radio base stations eNB1, eNB2 and a UE. In the example of FIG. 1A, eNB1 is a radio base station forming a macro cell (hereinafter referred to as the "macro base station") and eNB2 is a radio base station forming a small cell (hereinafter referred to as the "small base station").

For example, the small base station may be configured as a remote radio head (RRH) connected to the macro base station. When CA is employed, one scheduler (for example, a scheduler provided in the macro base station eNB1) controls scheduling of multiple cells.

In the structure where the scheduler provided in the macro base station eNB1 controls scheduling of multiple cells, it is expected that the base stations are connected with high-speed channels (also referred to as "ideal backhaul") such as optical fibers.

Consequently, the user terminal UE has only to transmit UCI pertaining to each cell via the PUCCH of one cell (for example, the PCell). For example, transmission acknowledgement information (HARQ-ACK: Hybrid Automatic Repeat reQuest Acknowledgment) in response to downlink shared channels (PDSCHs: Physical Downlink Shared Channels) signals transmitted in the PCell (macro cell) and the SCell (small cell) is aggregated and allocated to the PUCCH resource of the PCell. In this case, it is not necessary to transmit a plurality of HARQ-ACK signals at the same time so that it becomes easy to secure uplink coverage.

Figure 1B:
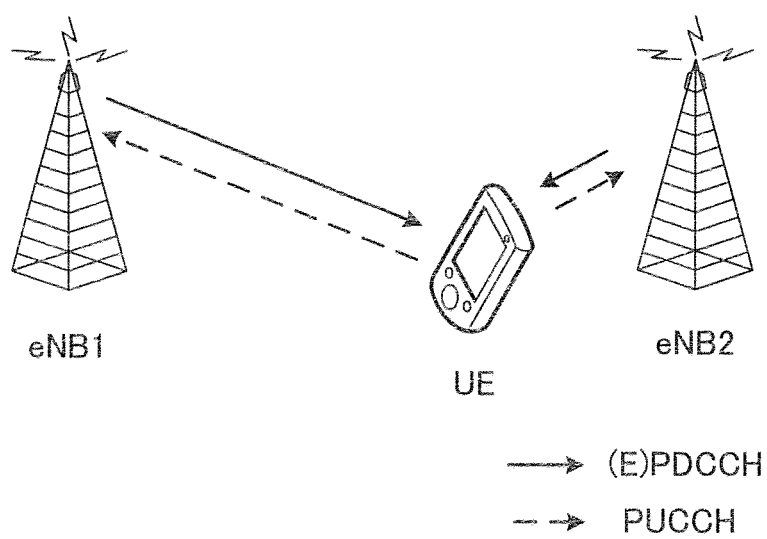

FIG. 1B shows dual connectivity (DC) applied in communication between radio base stations eNB1, eNB2 and a user terminal UE. In the example of FIG. 1B, eNB1 and eNB2 are both macro base stations.

When dual connectivity (DC) is employed, a plurality of schedulers are provided separately, and these multiple schedulers (for example, the scheduler provided in the macro base station eNB1 and the scheduler provided in the macro base station eNB2) each control scheduling of one or more serving cells.

In the structure where the scheduler of the macro base station eNB1 and the scheduler of the macro base station eNB2 each control scheduling of one or more serving cells, it is expected that the base stations are connected via a non-ideal backhaul that produces unignorable delay such as X2 interface.

The user terminal UE needs to feed back to each base station, UCI relating to a cell formed by the base station. In other words, the user terminal UE needs to feed back UCI by allocating PUCCH to a radio resource of at least one SCell as well as to a radio resource of PCell (PUCCH on SCell).

In dual connectivity (DC), the terminal thus needs to transmit PUCCH in at least two cells, but it is advantageously possible to achieve the same throughput improvement effect as that in carrier aggregation (CA), without the need to establish connection between cells via ideal backhaul.

Also in carrier aggregation (CA), PUCCH allocation to SCell like in dual connectivity (DC) has been considered as well.

Figure 2:
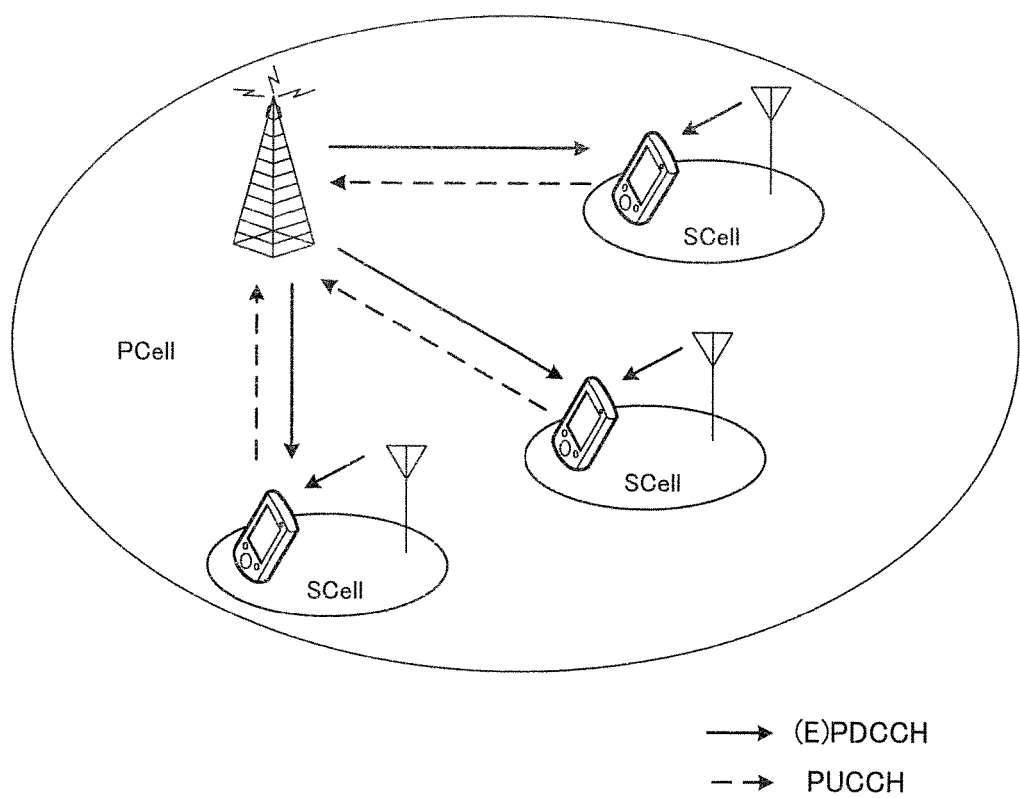
FIG. 2 is a diagram schematically illustrating the deployment scenario 4 of carrier aggregation.

FIG. 2 is a diagram for explaining a deployment scenario #4 of carrier aggregation (CA). In the example illustrated in FIG. 2, the macro cell is indicated by PCell and the small cell is indicated by SCell. In the deployment scenario #4 of carrier aggregation (CA), coverage of the macro cell is allocated in the frequency F1 and the traffic of the macro cell is off-loaded and placed on the small cell formed by RRH in the frequency F2 (F1<F2). In such a configuration, it is possible to achieve the advantageous effects of securing mobility by the macro cell and increasing capacity by the small cell.

However, as explained above, according to carrier aggregation (CA), UCI feedback by PUCCH is only possible via PCell. Accordingly, in the deployment scenario #4 of carrier aggregation (CA), there is increase in traffic for UCI feedback in uplink of the macro cell due to increase in number of small cells. With this increase, the uplink resources of the macro cell are occupied by PUCCH, which restricts the capacity increasing effect by the small cell.

Then, in the deployment scenario #4 of carrier aggregation (CA), PUCCH allocation to SCell is performed like in dual connectivity (DC) so that the user terminal can off-load UCI feedback to the small cell. This, however, can be achieved only if the user terminal supports uplink CA (UL-CA).

Considering machine costs and implementation easiness, PUCCH allocation to SCell is preferably determined in accordance with the common policy for carrier aggregation (CA) and dual connectivity (DC).

With reference to FIG. 3, description is made about PUCCH allocation to SCell. FIG. 3 provides diagrams each illustrating an example of PUCCH allocation to SCell in dual connectivity (DC) or carrier aggregation (CA). In FIG. 3, the horizontal axis indicates the frequency and there is illustrated connection between five cells using radio resources of given frequency bands and a user terminal UE.

In the following description, a cell that is configured to be allocatable with PUCCH is called "PUCCH cell", and SCell that is configured to be allocatable with PUCCH is called "PUCCH SCell". PUCCH cell includes PCell and PUCCH SCell.

Figure 3A:
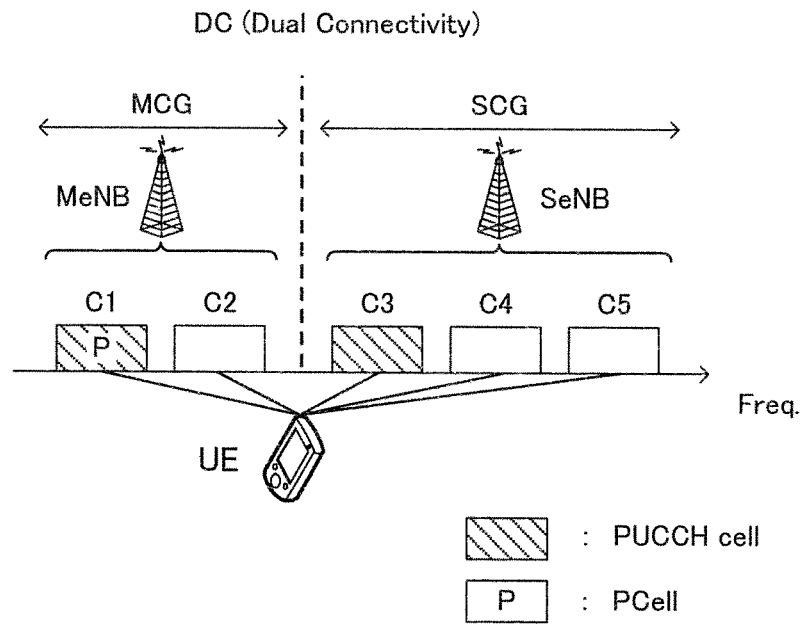
FIG. 3 provides diagrams each illustrating an example of PUCCH allocation to SCell.

FIG. 3A is a diagram illustrating an example of PUCCH allocation to SCell in dual connectivity (DC). In dual connectivity (DC), each radio base station establishes a cell group (CG) consisting of one or a plurality of cells. Each CG consists of one or more cells formed by the single radio base station or one or more cells formed by the single transmission point such as transmission antenna device and transmission station or the like.

The cell group (CG) including PCell is called master cell group (MCG: Master CG) and each cell group other than MCG is called secondary cell group (SCG: Secondary CG). Each cell group (CG) is able to perform carrier aggregation (CA) of two or more cells.

The radio base station where MCG is configured is called master base station (MeNB: Master eNB) and each radio base station were SCG is configured is called secondary base station (SeNB: Secondary eNB).

The total number of cells that constitute MCG and SCG is set to a given value or less (for example, 5 or less). This given value may be determined in advance or dynamically determined between the radio base station eNB and the user terminal UE. Or, a combination of the total number of cells that cons the configurable MCG and SCG with the cells in accordance with implementation of the user terminal UE may be signaled to the radio base station eNB as capability signaling.

In FIG. 3A, the user terminal UE is connected to five cells of C1 through C5. In FIG. 3A, cell C1 is PCell and cells C2 through C5 are SCells. In addition, cells C1 and C2 constitute MCG and cells C3 through C5 constitute SCG.

In each cell group (CG), at least one cell is configured to be capable of PUCCH feedback. in FIG. 3A, cell C1 as PCell is configured as PUCCH cell and cell C3 as SCell is configured as PUCCH cell. That is, UCI feedback by PUCCH of MCG is performed by PCell (cell C1) and UCI feedback by PUCCH of SCG is performed by PUCCH SCell (cell C3).

Here, when receiving instructions of uplink PUSCH transmission, the user terminal UE may multiplex UCI with PUSCH and transmit the resultant. That is, UCI feedback by PUSCH is performed without restricting to PUCCH cell.

Figure 3B:
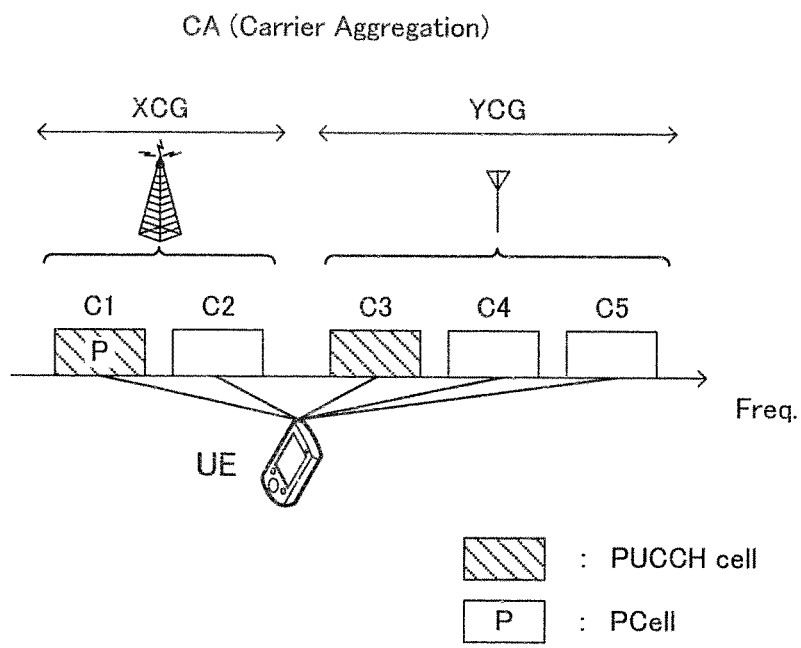

FIG. 3B is a diagram illustrating an example of PUCCH allocation to SCell in carrier aggregation (CA). As described above, from the viewpoint of allocating PUCCH in accordance with the common polity for carrier aggregation (CA) and dual connectivity (DC), each radio bases station establishes a cell group (CG) consisting of one or a plurality of cells even in carrier aggregation (CA). Each cell group (CG) is comprised of one or more cells formed by a single radio base station or one or more cells formed by a single transmission point such as a transmission antenna device, transmission station or the like.

In the following description, in carrier aggregation (CA), cell group (CG) including PCell is called XCG and cell group (CG) other than XCG is called YCG. In each cell group (CG), carrier aggregation of two or more cells can be executed. The total number of cells that constitute XCG and YCG is set to be a given value or less (for example, 5 or less). This given value may be determined in advance or may be dynamically determined between the radio base station eNB and the user terminal UE.

In each cell group (CG), at least one cell is configured to feed back PUCCH. In FIG. 3B, cell C1 as PCell is configured to be PUCCH cell of XCG cell C3 as SCell is configured to be PUCCH cell of YCG. UCI feedback by XCG PUCCH is performed in PCell (cell C1) and UCI feedback by YCG PUCCH is performed in PUCCH SCell (cell C3).

When receiving an instruction of uplink PUSCH transmission, the user terminal UE may multiplex UCI to PUSCH and transmit it. That is, UCI feedback by PUSCH is performed even if the cell is not PUCCH cell.

Information about PUCCH cell is signaled from the radio base station eNB to the user terminal UE by higher layer signaling such as RRC signaling or broadcast signal. One of the PUCCH cells is always PCell. In addition, in all cell groups (CGs), three or more PUCCH cells may be configured. However, the PUCCH cell needs to a cell where uplink carrier aggregation (UL-CA) is configured.

The PUCCH cell may be changed in accordance with any network or traffic condition. Change instruction is given, like setting of PUCCH cell, by higher layer signaling such as RRC messages. In dual connectivity (DC), the radio base station eNB or user terminal UE transmits an RRC message from the cell on MCG. In carrier aggregation (CA), the radio base station eNB or user terminal UE is able to transmit an RRC message from any cell.

Since PUCCH is transmitted only in PCell up to LTE Rel. 11, change of a PUCCH cell is performed by PCell changed to instruct PCell change. PCell change is performed by mechanism and processing equivalent to those of handover. That is, the radio base station eNB and the user terminal UE need to stop communication after PCell change is instructed until PCell change is completed.

In the existing technique, there is no definition for the operation and method of a terminal where a plurality of PUCCH cells are configured and PUCCH cell change is instructed. Accordingly, it is not definite what cell PUCCH the user terminal UE uses to transmit delivery acknowledgement information (HARQ-ACK) in response to the PUCCH cell change instruction.

For the cell group (CG) including PCell, PUCCH is transmitted from PCell. That is, change in PUCCH cell in the cell group (CG) including PCell means nothing but PCell change and exiting mechanism for PCell change can be applied.

As for the cell group (CG) not including PCell, PUCCH is transmitted from any one of SCells. That is, for change in PUCCH cell in the cell group (CG) not including PCell, there is no PCell change. Accordingly, when changing in PUCCH cell in the cell group (CG) not including PCell, the use terminal UE is able to change PUCCH cell in the cell group (CG) not including PCell while maintaining the connection of the cell group (CG) including PCell.

Change in PUCCH cell is preferably performed by the common method for carrier aggregation (CA) and dual connectivity (DC).

Considering the common method for carrier aggregation (CA) and dual connectivity (DC), the present inventors have finally found control that enables change in PUCCH cell.

Specifically, the user terminal transmits PUCCH (HARQ-ACK) in response to an RRC message to instruct change in PUCCH SCell by using PUCCH transmission setting before change, and then, the PUCCH SCell is changed. According to this method, the radio base station eNB and the user terminal UE agree in recognition of a PUCCH resource for HARQ-ACK in response to the RRC message to instruct change in PUCCH SCell, which enables smooth transmission and reception of HARQ-ACK.

The following description is made in detail about control to enable change in PUCCH cell by the common method for carrier aggregation (CA) and dual connectivity (DC).

(First Embodiment)

The first embodiment deals with the steps for changing PUCCH SCell in dual connectivity (DC) and carrier aggregation (CA).

Figure 4:
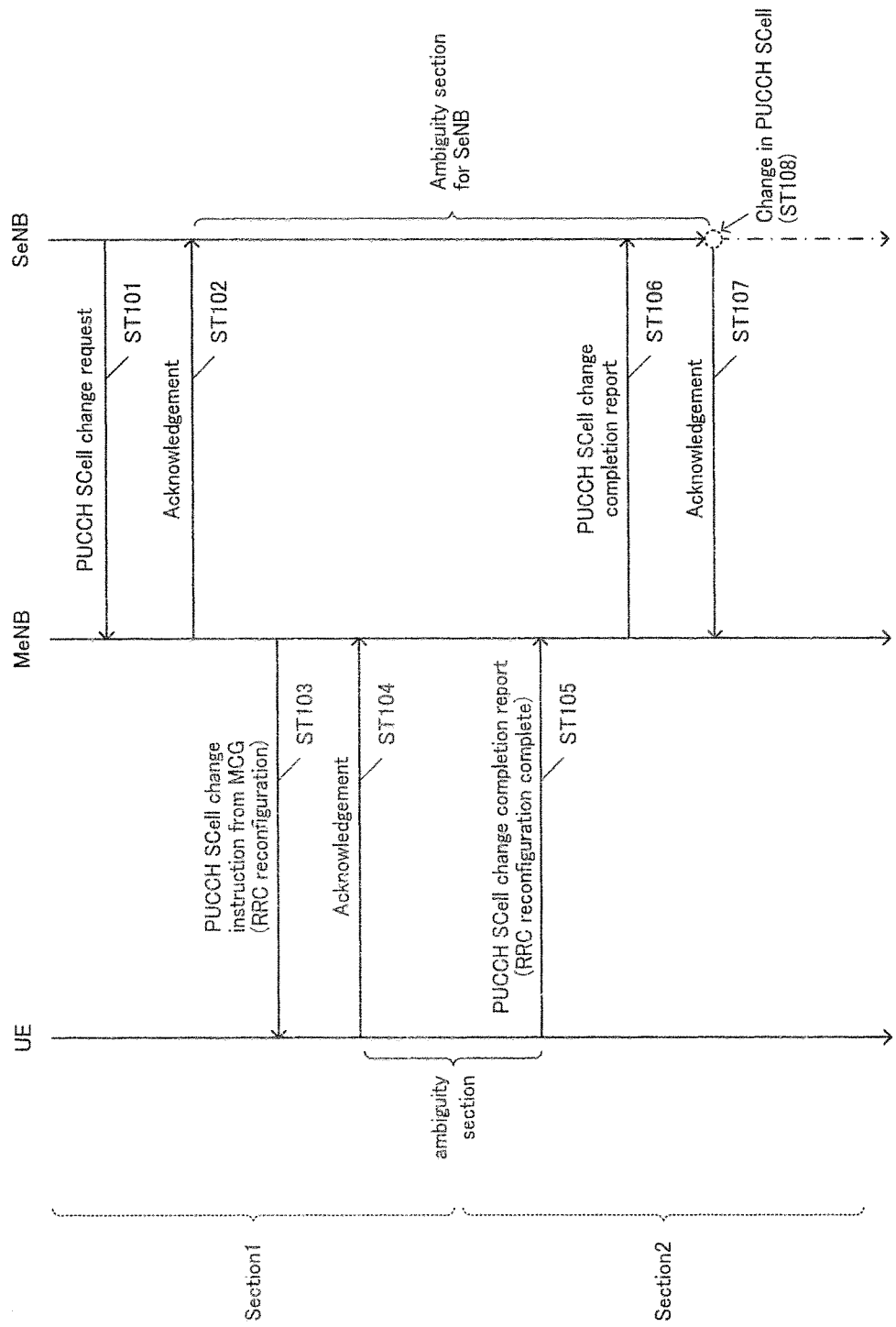
FIG. 4 is a sequence diagram illustrating the steps of changing PUCCH SCells in dual connectivity (DC) according to the first embodiment.

First description is made, with references to FIGS. 4 and 5, about the steps for changing PUCCH SCell in dual connectivity in dual connectivity (DC).

Figure 5A:
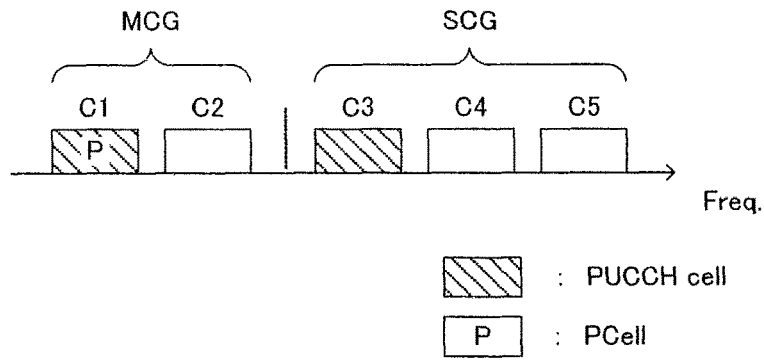
FIG. 5 provides diagrams each for explaining an example of the steps of changing PUCCH SCells in dual connectivity (DC) according to the first embodiment.

As illustrated in FIG. 5A, before change in PUCCH SCell, the PUCCH SCell of SCG is cell C3. As illustrated in FIG. 5C, after change in PUCCH SCell, PUCCH SCell of SCG is cell C4.

As illustrated in FIG. 4, first, SeNB transmits a PUCCH SCell change request to MeNB (ST101). When receiving the change request, MeNB transmits ACK to SeNB (ST102).

MeNB transmits, to the user terminal UE, an RRC message including a PUCCH SCell change instruction to instruct RRC reconfiguration (ST103). When receiving the change instruction, the user terminal transmits ACK to MeNB (ST104). In the case of dual connectivity (DC), the RRC message is transmitted from MCG, and therefore, the user terminal UE transmits HARQ-ACK in response to this RRC message in PUCCH of PCell.

The user terminal UE changes PUCCH SCells after receiving the RRC message and before reporting completion of PUCCH SCell change. The period after receiving this RRC message before reporting completion of PUCCH Well change is called "ambiguity section".

In this ambiguity section, the user terminal UE changes radio resource control (RRC) configuration in accordance with the received RRC message. The time required for change depends on implementations of the user terminal UE. In other words, the radio base station eNB is not able to recognize when the user terminal UE changes the radio resource control (RRC) configuration in the ambiguity section exactly.

After change in configuration, the user terminal UE transmits, to MeNB, RRC reconfiguration complete including a report of completion of PUCCH SCell change (ST105).

After receiving the change completion report, MeNB transmits, to SeNB, a PUCCH SCell change completion report (ST106). When receiving the change completion report, SeNB transmits ACK to MeNB (ST107). Then, SeNB changes PUCCH SCells (ST108). With this change, the PUCCH SCell of SCG is changed from cell C3 before change to cell C4 after change (see FIG. 5C).

For example, signaling (for example, PUCCH SCell change request, completion report, ACK and so on) between SeNB and MeNB is transmitted an received via backhaul and its delay depends on the kind of the backhaul, traffic, transmission distance between eNBs and so on. The RRC message from MeNB to the user terminal UE is not necessarily transmitted and received correctly and may be subjected to retransmission control. Further, as described above, the user terminal UE takes time after receiving the RRC message and until completing the configuration, which time depends on implementations of the user terminal UE. For this reason, the period after SeNB transmits a PUCCH SCell change request to MeNB until receiving a PUCCH SCell change completion report from MeNB becomes an ambiguity section for SeNB.

Figure 5B:
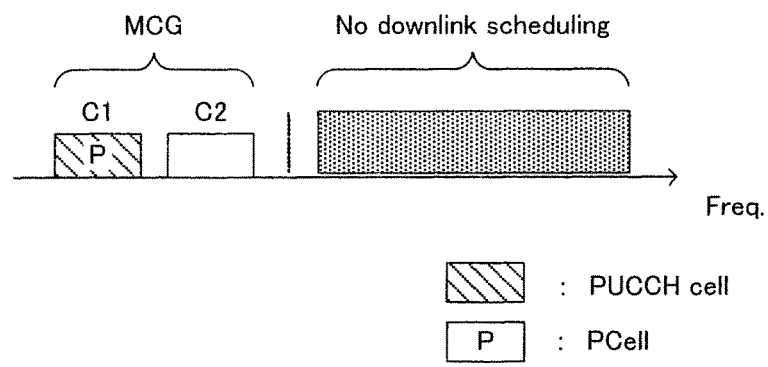
Figure 5C:
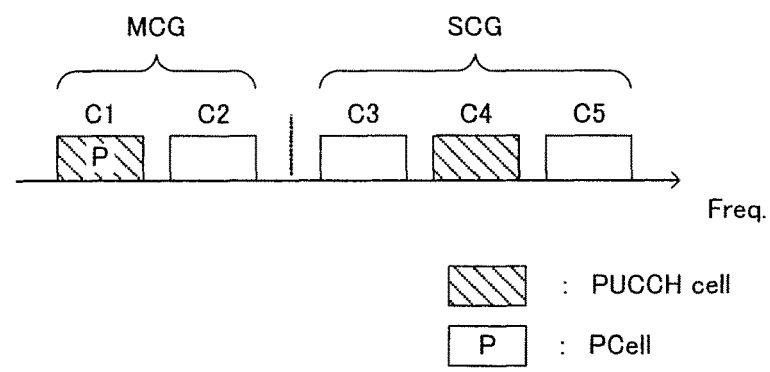

Accordingly, in this ambiguity section, SeNB does not perform downlink scheduling to cells that constitute SCG (see FIG. 5B). The user terminal UE may change PUCCH SCells somewhere in the period after transmitting PUCCH in response to the PUCCH SCell change instruction received from MCG until transmitting a configuration completion report.

Figure 6:
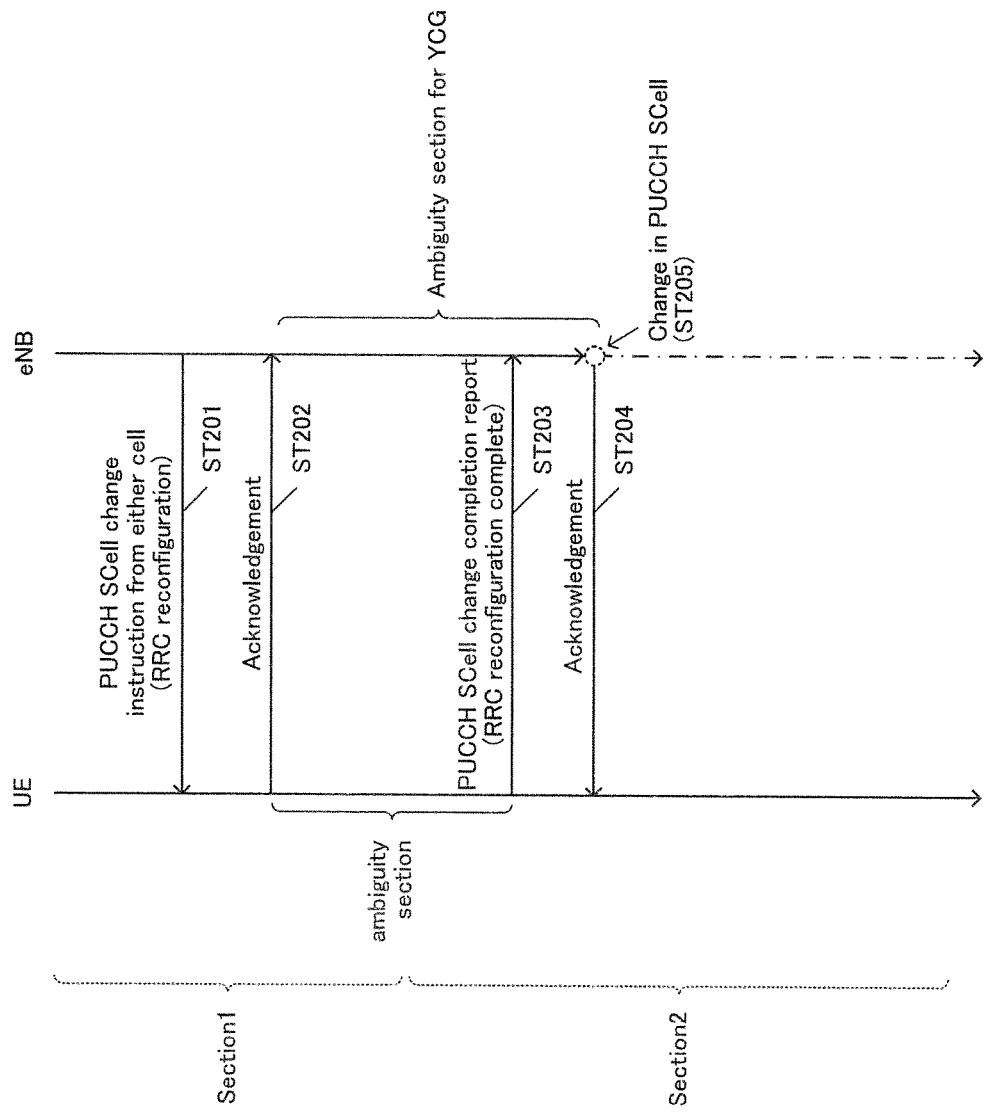
FIG. 6 is a sequence diagram illustrating the steps of changing PUCCH SCells in carrier aggregation (CA) according to the first embodiment.

Next description is made, based on FIGS. 6 and 7, about the steps for changing PUCCH SCells in carrier aggregation (CA).

Figure 7A:
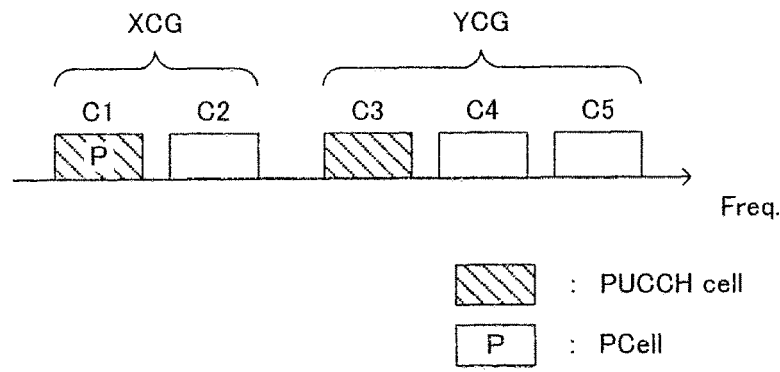
FIG. 7 provides diagrams each for explaining an example of the steps of changing PUCCH SCells in carrier aggregation (CA) according to the first embodiment.

As illustrated in FIG. 7A, before change in PUCCH SCell, PUCCH SCell of YCG is cell 3. As illustrated in FIG. 7C, after change in PUCCH SCell, the PUCCH SCell of YCG is cell C4.

As illustrated in FIG. 6, first, the radio base station eNB transmits an RRC message including a PUCCH SCell change instruction to the user terminal UE and instructs RRC reconfiguration (ST201). After receiving the change instruction, the user terminal transmits ACK to the radio base station eNB (ST202).

In the case of carrier aggregation (CA), RRC message including PUCCH SCell change instruction is able to be transmitted by any cell that belongs to XCG or YCG. When receiving the RRC message, the user terminal UE transmits HARQ-ACK by the cell that is configured with PUCCH transmission in the cell group (CG) to which the cell transmitting and receiving this RRC message belongs.

When receiving the RRC message in the cell group including PCell, that is, XCG, the user terminal UE transmits HARQ-ACK in response to the RRC message in PUCCH of PCell.

When receiving the RRC message in the cell not including PCell, that is, YCG, the user terminal UE transmits HARQ-ACK in response to the RRC message in PUCCH cell before change and in accordance with the PUCCH resource allocation method before change.

The user terminal UE changes PUCCH SCells after receiving the RRC message and before reporting PUCCH SCell change completion. This period after receiving this RRC message and before reporting PUCCH SCell change completion is called ambiguity section.

In this ambiguity section, the user terminal UE changes the radio resource control (RRC) configuration in accordance with the received RRC message. The time required for change depends on implementations of the user terminal. In other words, the radio base station eNB is not able to recognize when the user terminal UE changes the radio resource control (RRC) configuration in the ambiguity section exactly.

After completing the change, the user terminal transmits, to the radio base station eNB, RRC reconfiguration complete including the PUCCH SCell change completion report (ST203). The radio base station eNB receiving the change completion report transmits ACK to the user terminal UE. Then, the radio base station eNB changes PUCCH SCells (ST205). With this process, the PUCCH SCell of YCG is changed from cell C3 before change to cell C4 after change (see FIG. 7C).

Since carrier aggregation (CA) is premised on ideal backhaul, there occurs no delay in signaling via the backhaul between radio base stations eNBs. Accordingly, the period after the radio base station eNB transmits a PUCCH SCell change instruction to the user terminal UE before the radio base station eNB receives a PUCCH SCell change completion report from the user terminal becomes ambiguity section for YCG.

Figure 7B:
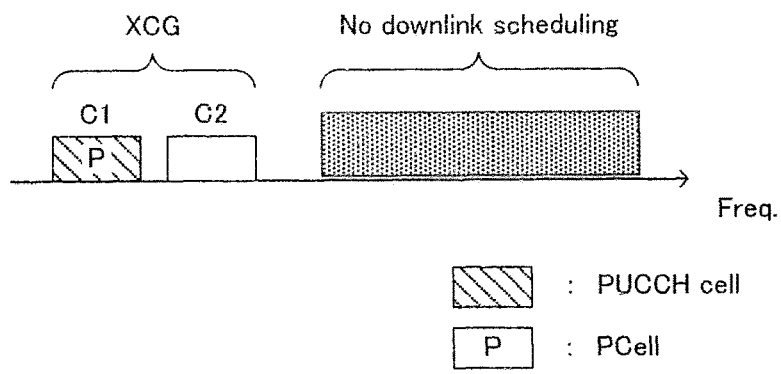
Figure 7C:
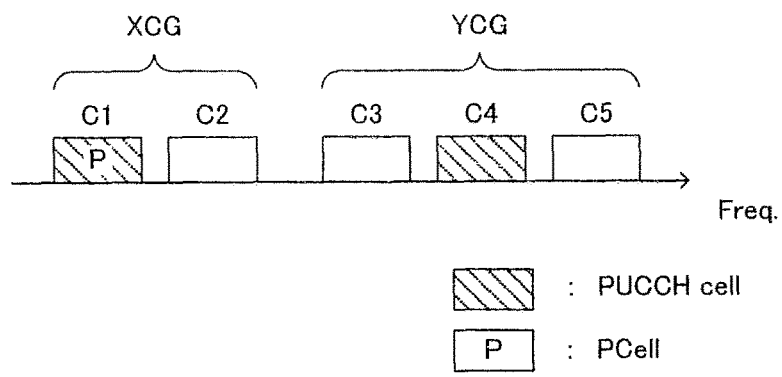

Accordingly, in this ambiguity section, eNB does not operate to perform downlink scheduling to cells constituting YCG (see FIG. 7B). Here, the user terminal UE has only to change in PUCCH SCell somewhere in the period after transmitting PUCCH in response to the received PUCCH SCell change instruction before transmitting the change completion required.

Thus, in either case of dual connectivity (DC) and carrier aggregation (CA), the user terminal UE transmits HARQ-ACK in response to the RRC message for instructing change in PUCCH SCell by the PUCCH transmission configuration before change. With this structure, it is possible to have agreement in recognition of PUCCH resource and transmission cell for HARQ-ACK in response to the RRC message to instruct change between the radio base station eNB and the user terminal UE.

For example, it is sometimes possible to perform change in PUCCH SCell at the same time as transmitting HARQ-ACK in response to the PUCCH SCell change instruction. However, all the use terminals UEs are not able to complete change in PUCCH SCell at the same time as transmitting HARQ-ACK. Therefore, it is preferable for the radio base station eNB that the user terminal UE transmits HARQ-ACK by SCell that is determined in accordance with a given rule irrespective of the implementations and processing rate. With this configuration, it is possible to perform transmission and reception of HARQ-ACK between the radio base station eNB and the use terminal UE smoothly.

In addition, while change in PUSCH SCell configuration, downlink scheduling is not performed in the cell group not including PCell and thereby, it is possible to prevent discrepancy in PUCCH resource recognition between the radio base station eNB and the user terminal UE.

Whether or not to perform downlink scheduling during change in PUCCH SCell configuration depends on implementations of the radio base station eNB and the user terminal UE is not able to recognize what restriction is imposed on scheduling. Accordingly, in either case of dual connectivity (DC) and carrier aggregation (CA), the operation of the user terminal UE is the same during change in PUCCH SCell, and only one implementation is enough to cover both cases. Therefore, it is possible to eliminate the need to incorporate different control of the user terminal UE depending on the network configuration and possible to reduce implementation load and achieve cost reduction.

As described above, the downlink scheduling constraints depend on implementation of the radio base station eNB. In the section where it is unclear which SCell and which PUCCH resource the user terminal UE uses to transmit PUCCH, instead of imposing downlink scheduling constraints, the radio base station eNB may monitor PUCCH in both of the SCell before change and the changed SCell.

With reference to FIG. 8, description is made about the steps of monitoring PUCCH in SCell before change and a changed SCell without downlink scheduling constraints in the case of dual connectivity (DC).

Figure 8A:
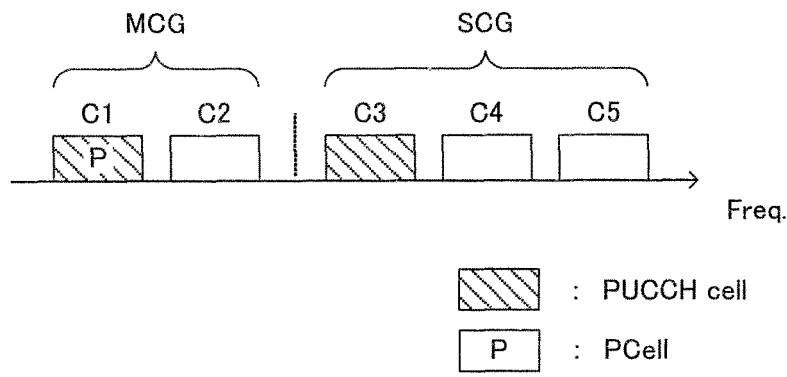
FIG. 8 provides diagrams each for explaining another example of the steps of changing PUCCH SCells in dual connectivity (DC) according to the first embodiment.
Figure 8B:
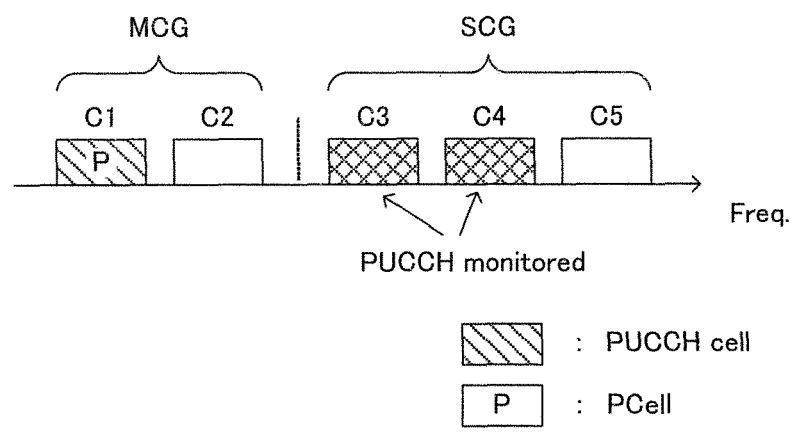
Figure 8C:
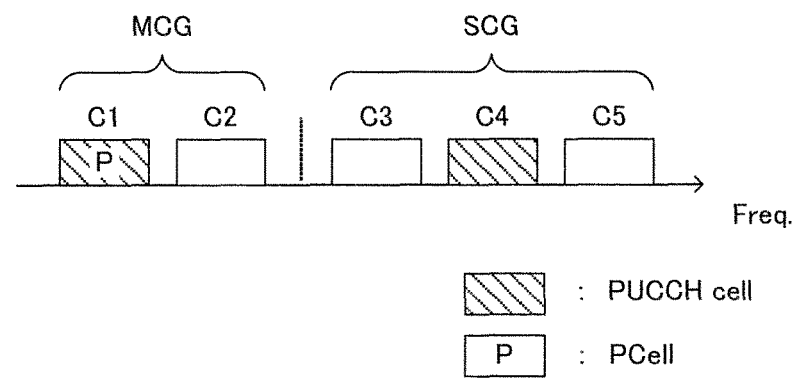

As illustrated in FIG. 8A, before change in PUCCH SCell, the PUCCH SCell of SCG is cell C3. As illustrated in FIG. 8C, after change in PUCCH SCell, the PUCCH SCell of SCG is cell C4.

Therefore, in the ambiguity section for SeNB (see FIG. 4), SeNB is not able to determine which cell the user terminal UE uses to transmit PUCCH between cell C3 an cell C4. In this case, SeNB does not subject to downlink scheduling constraints, but when there occurs downlink data, SeNB may rather perform downlink scheduling in the same manner as when there is no instruction to change in PUCCH SCell and monitor PUCCH in both of SCell before change and changed SCell, that is both of cell C3 and cell C4 (see FIG. 8B).

Then, description is made, with reference to FIG. 9, about the steps of monitoring PUCCH in SCell before change and changed SCell, without constrains in downlink scheduling in the case of carrier aggregation (CA).

Figure 9A:
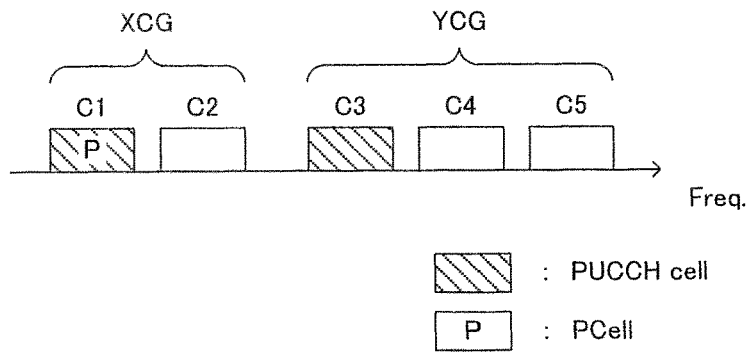
FIG. 9 provides diagrams each for explaining another example of the steps of changing PUCCH SCells in carrier aggregation (CA) according to the first embodiment.
Figure 9B:
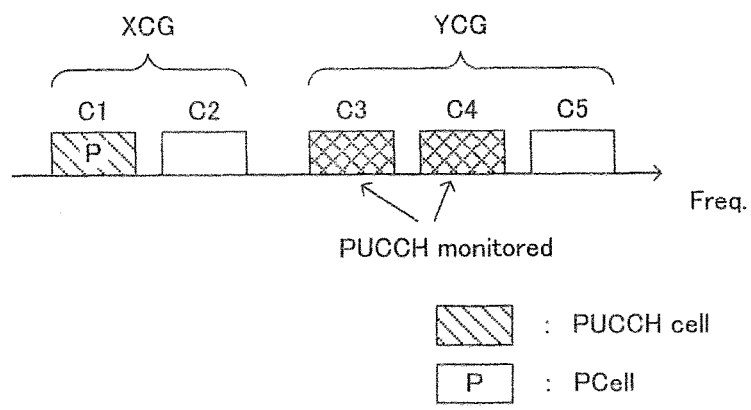
Figure 9C:
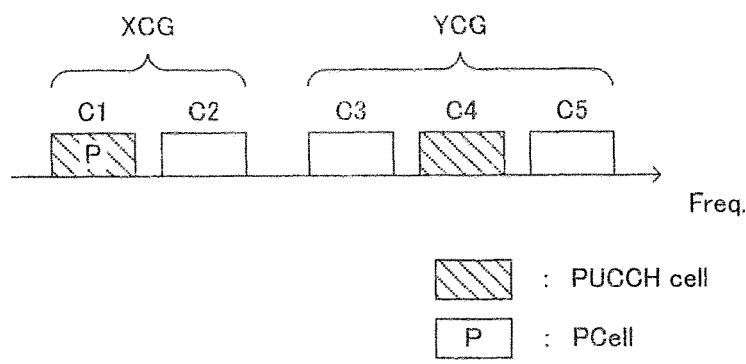

As illustrated in FIG. 9A, before change in PUCCH SCell, the PUCCH SCell of YCG is cell C3. As illustrated in FIG. 9C, after change in PUCCH SCell, the PUCCH SCell of YCG is cell C4.

Therefore, in the ambiguity section for YCG (see FIG. 6), the radio base station eNB is not able to determine which cell the user terminal UE uses to transmit PUCCH between cell C3 an cell C4. In this case, the radio base station eNB does not subject to downlink scheduling constraints, but when there occurs downlink data, the radio base station eNB may rather perform downlink scheduling in the same manner as when there is no instruction to change in PUCCH SCell and monitor PUCCH in both of SCell before change and changed SCell, that is both of cell C3 and cell C4 (see FIG. 9B).

In the ambiguity section, the user terminal UE transmits PUCCH by using either of the SCell before change and the changed SCell. Then, by monitoring PUCCH in both of the SCell before change and the changed SCell, it is possible to avoid inconsistency in PUCCH resource recognition between the radio base stat on eNB and the user terminal UE even when the radio base station eNB is not implemented with downlink scheduling constraints.

Next description is made about a modified example of the first embodiment. In the above description, the PUCCH SCell change is instructed by RRC message, hut the PUCCH SCell change may be instructed by combination of RRC message and MAC Ce (Control Element).

Figure 10A:
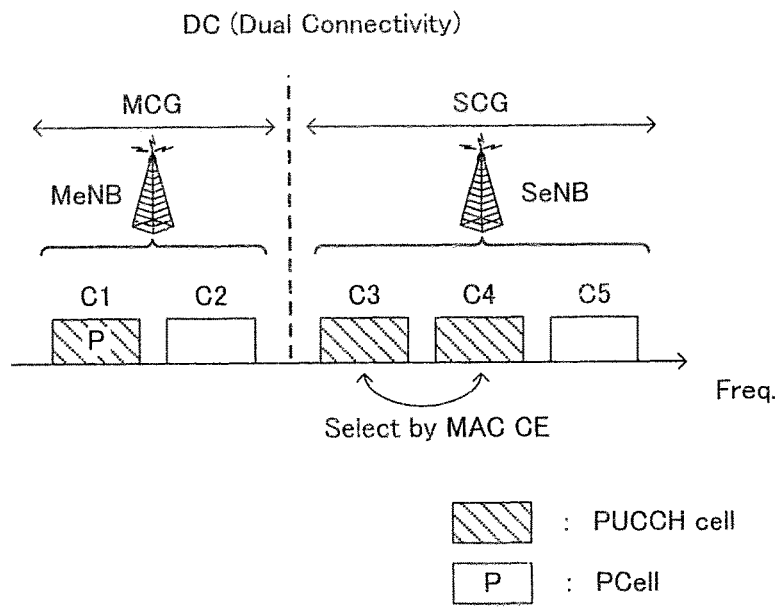
FIG. 10 provides diagrams each for explaining the steps of changing in PUCCH SCell by using combination of RRC message and MAC CE in a modification to the first embodiment.
Figure 10B:
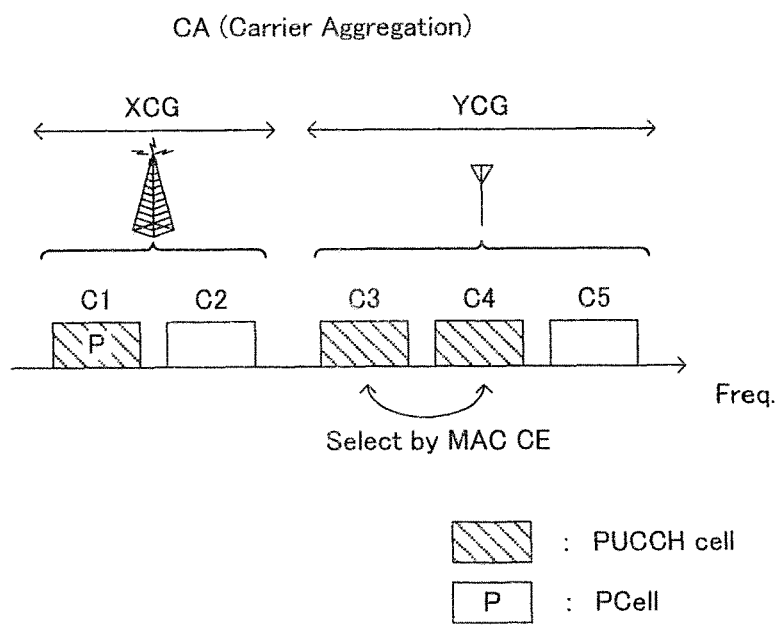

Specifically, the radio base station eNB sets a plurality of PUCCH cells by RRC message. Then, the radio base station eNB instructs SCell to transmit PUCCH actually, by MAC CE according to need. In the example illustrated in FIG. 10A, in the case of dual connectivity (DC), cell C3 and cell C4 are set to PUCCH SCells by RRC message and either of cell C3 and cell C4 is instructed as SCell to transmit PUCCH actually, by MAC CE. As illustrated in FIG. 10B, the same goes for carrier aggregation (CA).

In the case of dual connectivity (DC), RRC message is transmitted in a cell that belongs to MCG. Therefore, SeNB signals SCells that are differ from the currently configured PUCCH SCell and become PUCCH SCell candidates, to the user terminal UE via MeNB. Then, SeNB instructs SCell that is selected from the beforehand signaled PUCCH SCell candidates and is to be actually used for PUCCH transmission, to the user terminal by signaling included in MAC CE.

Here, the user terminal UE needs delay depending on implementation and processing speed after receiving the instruction by MAC CE until changing PUCCH SCells, likewise the ambiguity section for RRC message. Accordingly, in this modified example, the user terminal UE is con red to transmit PUCCH for downlink data including a PUCCH transmission SCell change instruction in MAC CE by using the PUCCH SCell before change.

In the case of carrier aggregation (CA), RRC message is able to be transmitted in any cell. Accordingly, the radio base station eNB signals directly to the user terminal UE, SCells that are different from the currently configured PUCCH SCell and are PUCCH SCell candidates. Then, the radio base station eNB instructs, to the user terminal UE, SCell that is from the beforehand signaled PUCCH SCell candidates and is to be actually used for PUCCH transmission.

Here, the user terminal UE needs delay depending on implementation and processing speed after receiving the instruction by MAC CE until changing PUCCH SCells, likewise the ambiguity section for RRC message. Accordingly, in this modified example, the user terminal UE is configured to transmit PUCCH for downlink data including a PUCCH transmission SCell change instruction in MAC CE by using the PUCCH SCell before change.

In the change instruction by MAC CE, the ambiguity section that the user terminal UE needs is able to be net shorter than that in the change instruction by RRC message. Accordingly, in this modified example, the ambiguity section is able to be set shorter by selecting SCell actually used for PUCCH transmission, by MAC CE. In addition, if PUCCH transmission for downlink data including the change instruction by MAC CE is configured to be performed in PUCCH SCell before change, it is possible to avoid inconsistency of the PUCCH resource recognition between the radio base station eNB and the user terminal UE.

In the first embodiment, the cell group including PCell (MCG for dual connectivity (DC) and XCG for carrier aggregation (CA) in the example illustrated in the first embodiment) may continue communication without interruption even during change in PUCCH SCell setting. This is because downlink assignment in PCell and corresponding PUCCH transmission in PCell remain unchanged even during change in PUCCH SCell setting. With this structure, it is possible to perform data transmission and reception without interruption even during change in PUCCH SCell setting.

If communication in PCell continues without interruption even during change in PUCCH SCell setting, the PUCCH may be received simultaneously in both of the cell before change and the changed cell by false alarm. That is, the radio base station may detect PUCCH in both of SCell before change and changed SCell.

In this case, it may be configured that PUCCH of higher reliability is employed and unemployed PUCCHs are discarded. The PUCCH of higher reliability may be PUCCH of higher reference signal received power (RSRP) reported from the user terminal UE, PUCCH of stronger reception signal power in the radio base station eNB, PUCCH of better quality clearly indicated by Channel Quality Indicator (CQI) indicated from the user terminal UE, PUCCH such that the radio base station eNB receives SRS (Sounding Reference Signal) transmitted from the user terminal UE and determines it has better communication quality, or the like. In addition, it may be configured that there is provided a threshold value for determining better quality for each of these reliability levels and a rule is established to discard PUCCHs if none of the PUCCH reliability levels is higher than the threshold value.

In addition, regarding PUCCHs that are received in the ambiguity section and PUCCHs that have low reliability and are therefore not employed, there may be established a rule not to be used in uplink synchronization determination of TA (Timing Advance) calculation.

In the first embodiment, the PUCCH SCell setting change instruction may be configured to be always performed in a cell group (CG) including PCell. In the case of dual connectivity (DC), the PUCCH SCell setting change instruction is always transmitted in MCG that is a cell group including PCell. In the case of carrier aggregation (CA), the PUCCH SCell setting change instruction is possibly transmitted in XCG that is a cell group including PCell or YCG that is a cell group not including PCell, however, as a rule, the PUCCH SCell setting change instruction is configured to be always transmitted in XCG.

As the PUCCH SCell setting change instruction is thus configured to be always transmitted in a cell group (CG) including PCell, the PUCCH SCell setting change operation in dual connectivity (DC) is able to be in complete agreement with the PUCCH SCell setting change operation in carrier aggregation (CA). Accordingly, it is possible to support both of dual connectivity (DC) and carrier aggregation (CA) by more unified mechanism.

(Second Embodiment)

The second embodiment deals with the steps for changing PUCCH SCell in the case where both or either of channel quality report (CQI: channel quality information) and scheduling request (SR) is configured to be transmitted in addition to HARQ-ACK in PUCCH SCell.

Figure 11A:
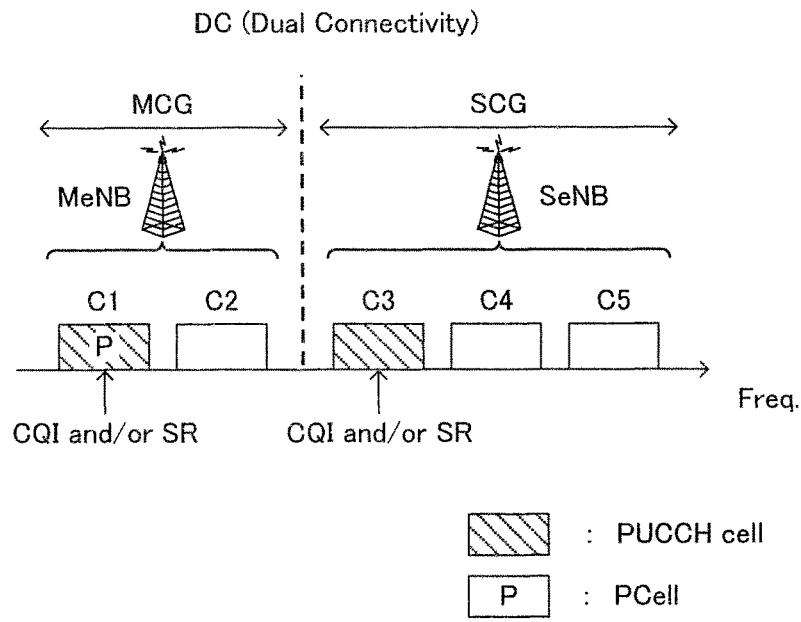
FIG. 11 provides diagrams each for explaining CQI transmission in a PUCCH SCell according to a second embodiment.
Figure 11B:
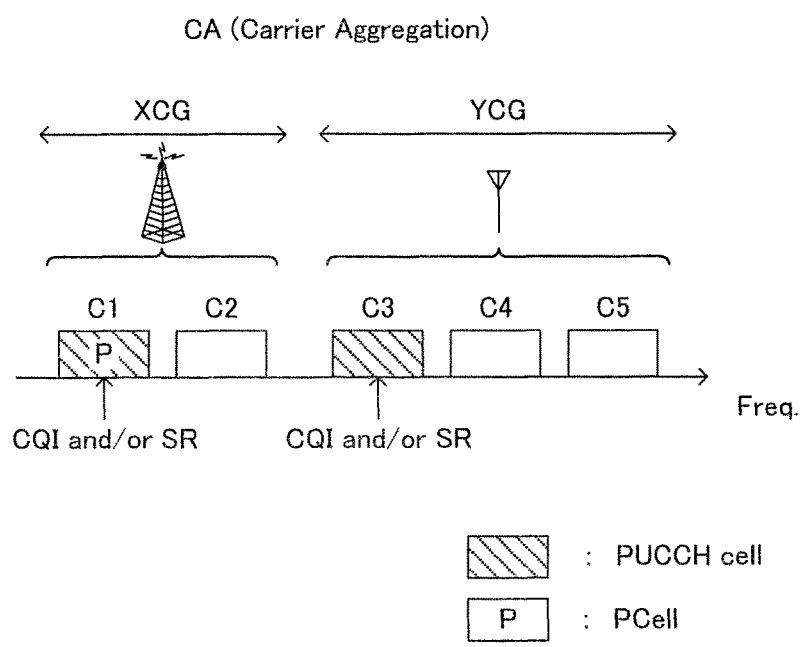

As illustrated in FIG. 11, in PUCCH SCell, both or either of CQI and SR may be set to be transmitted in addition to HARQ-ACK. The user terminal UE transmits both or either of CQI and SR with a pre-instructed PUCCH resource and a given period. The CQI report PUCCH resource and period and the SR transmission PUCCH resource and period may be the same or different from each other. In the following description, periodically transmitted PUCCH is simply referred to as CQI, but it is not limited to CQI report, but includes SR.

When receiving a PUCCH SCell change instruction, the user terminal UE may be unable to determine at which timing to change the CQI transmission PUCCH cell, PUCCH resource and transmission period.

In dual connectivity (DC), SeNB requests MeNB to change PUCCH SCell and the user terminal UE continues to transmit CQI periodically at PUCCH SCell before change until the user terminal UE changes PUCCH SCell actually (in section 1 in FIG. 4).

Then, the user terminal UE changes CQI transmission setting somewhere in the ambiguity section.

Then, in the section 2 in FIG. 4, the user terminal UE transmits CQI periodically in changed PUCCH SCell. On the other hand, it is after some time has passed since the user terminal UE transmits RRC reconfiguration complete to MeNB that SeNB receives a PUCCH SCell change completion report.

As such, SeNB is not able to recognize when the user terminal UE changes PUCCH to transmit CQI.

Likewise, in the case of carrier aggregation (CA), the user terminal UE transmits CQI in PUCCH SCell before change in the section 1 in FIG. 6, changes CQI transmission setting somewhere in the ambiguity section and transmits CQI in changed PUCCH SCell in the section 2 in FIG. 6.

In the case of carrier aggregation (CA), as compared with the case of dual connectivity (DC), there is no information exchange between MeNB and SeNB. Therefore, the ambiguity section for YCG can be set shorter. However, the radio base station eNB is not able to recognize when the user terminal UE changes PUCCH to transmit CQI.

Accordingly, the radio base station is not able to determine at which timing to release the PUCCH resource before change. Then, until the radio base station eNB determines that change is completed, the radio base station is not able to allocate this PUCCH resource to another user terminal UE. Further, since the radio base station eNB is not able to recognize a PUCCH resource that the user terminal UE uses to transmit CQI, the radio base station eNB may try to receive a CQI report in the PUCCH resource before change even after the user terminal UE has changes PUCCH resources. In this case, the radio base station eNB is inevitably to monitor wrong channel quality of the user terminal UE.

Further, the radio base station eNB is not able to recognize at which timing the user terminal UE changes PUCCH cell and resource.

Then, in the second embodiment, when the user terminal UE receives a PUCCH SCell change instruction, the user terminal UE stops CQI reporting in the PUCCH SCell before change. After the PUCCH SCell is changed, the radio base station eNB signals CQI report in the changed PUCCH.

Figure 12:
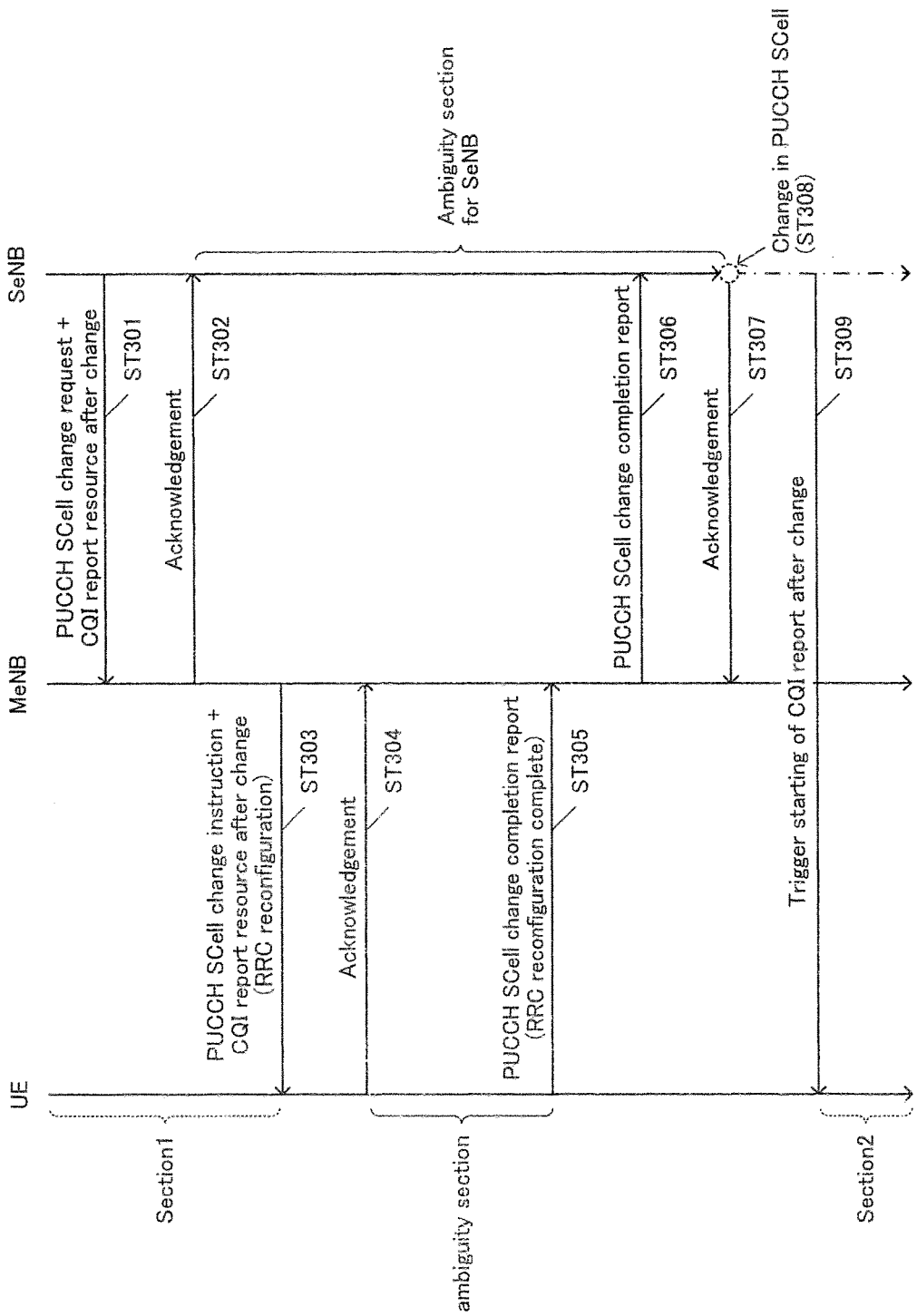
FIG. 12 is a sequence diagram illustrating the steps of changing in CQI report resource in dual connectivity (DC) according to the second embodiment.

With reference to FIG. 12, description is made about an example of steps of changing CQI report resources in dual connectivity (DC).

As illustrated in FIG. 12, when SeNB transmits a PUCCH SCell change request to MeNB, SeNB signals a changed CQI report resource (ST301). These may be given by the same signaling or separately. When receiving the PUCCH SCell change request, MeNB transmits ACK to SeNB (ST302).

MeNB transmits an RRC message including a PUCCH SCell change instruction and the changed CQI report resource to the user terminal UE and instructs RRC reconfiguration (ST303). After receiving them, the user terminal UE transmits ACK to MeNB (ST304) and stops transmission of the CQI report PUCCH before change.

The user terminal UE changes PUCCH SCells after receiving the RRC message until reporting the PUCCH SCell change completion. After the change is completed, the user terminal UE transmits RRC reconfiguration complete including PUCCH SCell change completion report to MeNB (ST305).

After receiving the change completion report, MeNB transmits a PUCCH SCell change completion report to SeNB (ST306). After receiving the change completion report, SeNB transmits ACK to MeNB (ST307). Then, SeNB changes PUCCH SCells (ST308).

After the user terminal UE has changed PUCCH SCells, SeNB triggers starting of CQI report in the changed PUCCH SCell by the user terminal UE (ST309). Triggering may be performed by RRC control signal, MAC CE, PDCCH (for example, periodic CQI trigger) or the like.

The user terminal UE starts CQI reporting in the changed PUCCH SCell. The user terminal UE may start CQI measurement before the CQI report is started. For example, the user terminal UE may start CQI measurement after the PUCCH SCell is changed in the ambiguity section for the user terminal UE or after the user terminal UE transmits a PUCCH SCell completion report. Since the CQI measurement is thus started as early as possible without CQI reporting, it is possible to average CQI in terms of time and also possible to report accurate CQI immediately after starting of the CQI report.

As another example of the dual connectivity (DC) case, SenB may request the user terminal UE to set a CQI report resource anew after SeNB receives a PUCCH SCell change completion report from MeNB (ST306).

Figure 13:
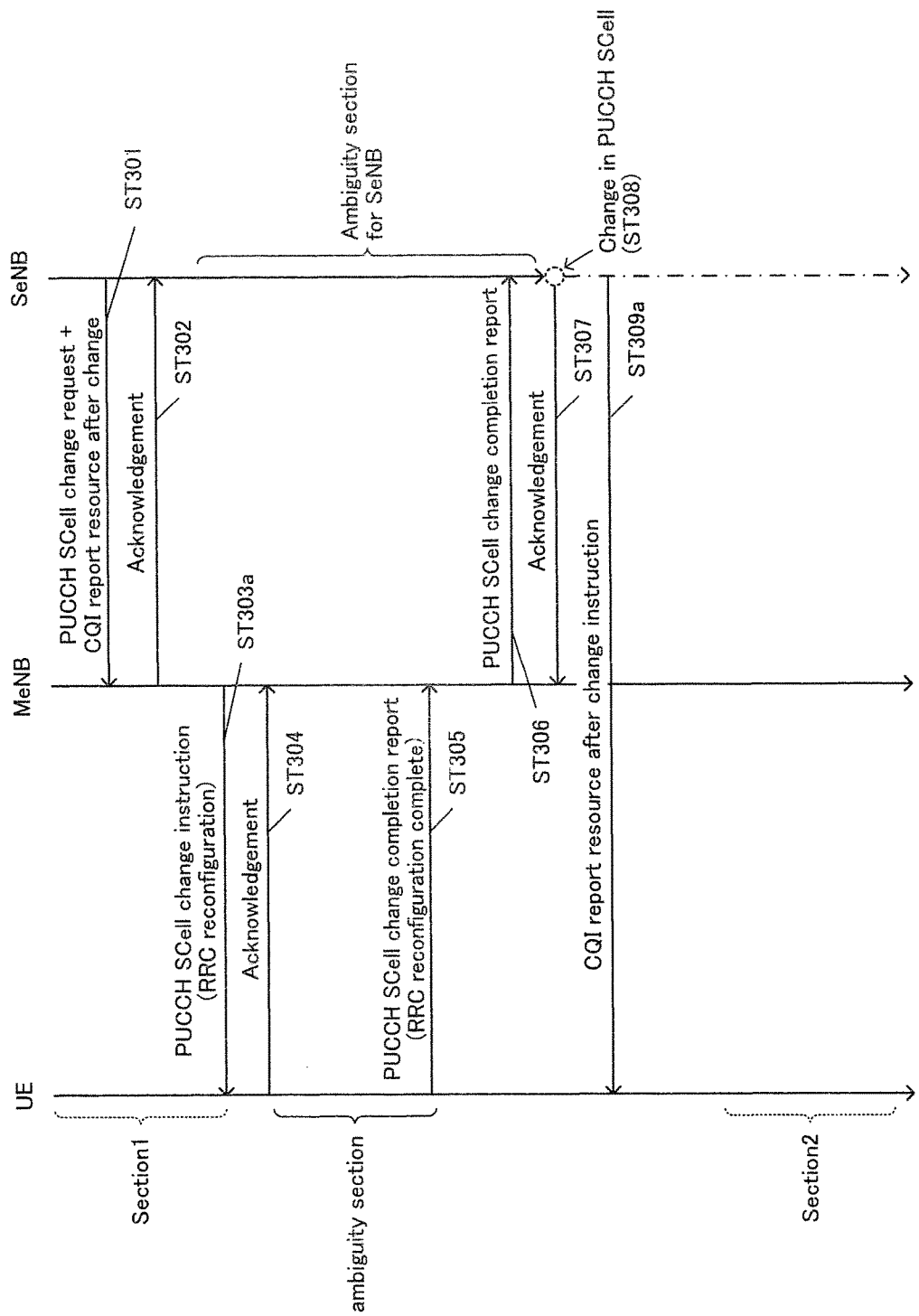
FIG. 13 is a sequence diagram illustrating the steps of changing in CQI report resource in dual connectivity (DC) according to the second embodiment.

With reference to FIG. 13, another example of the steps of changing CQI report resource in dual connectivity (DC) is described below. In FIG. 13. The same steps as those in FIG. 12 are denoted by like reference numerals.

As illustrated in FIG. 13, when SeNB first transmits PUCCH SCell change request to MeNB, SeNB also signals a changed CQI report resource (ST301). When receiving them, MeNB transmits ACK to SeNB (ST302). These may be given by the same signaling or separately.

MeNB transmits, to the user terminal UE, an RRC message including a PUCCH SCell change instruction and instructs RRC reconfiguration (ST303a). When receiving them, the user terminal UE transmits ACK to MeNB (ST304) and stops transmission of the CQI report PUCCH before change.

The user terminal UE changes PUCCH SCells after receiving the RRC message until reporting a PUCCH SCell change completion. After change is completed, the user terminal UE transmits, to MeNB, RRC reconfiguration complete including the PUCCH SCell change completion report (ST305).

After receiving the change completion report, MeNB transmits, to SeNB, the PUCCH SCell change completion report (ST306). When receiving the change completion report, SeNB transmits ACK to MeNB (ST307). Then, SeNB changes PUCCH SCells (ST308).

Then, SeNB requests the user terminal UE to set CQI PUCCH again (ST309a). The user terminal starts CQI reporting in the changed PUCCH SCell.

In the steps illustrated in FIG. 13, the CQI PUCCH resource is not reserved before the PUCCH SCell change processing is started, but the CQI PUCCH resource is instructed after the changed PUCCH SCell is set, which enables accurate CQI resource allocation in accordance with the situation.

Figure 14:
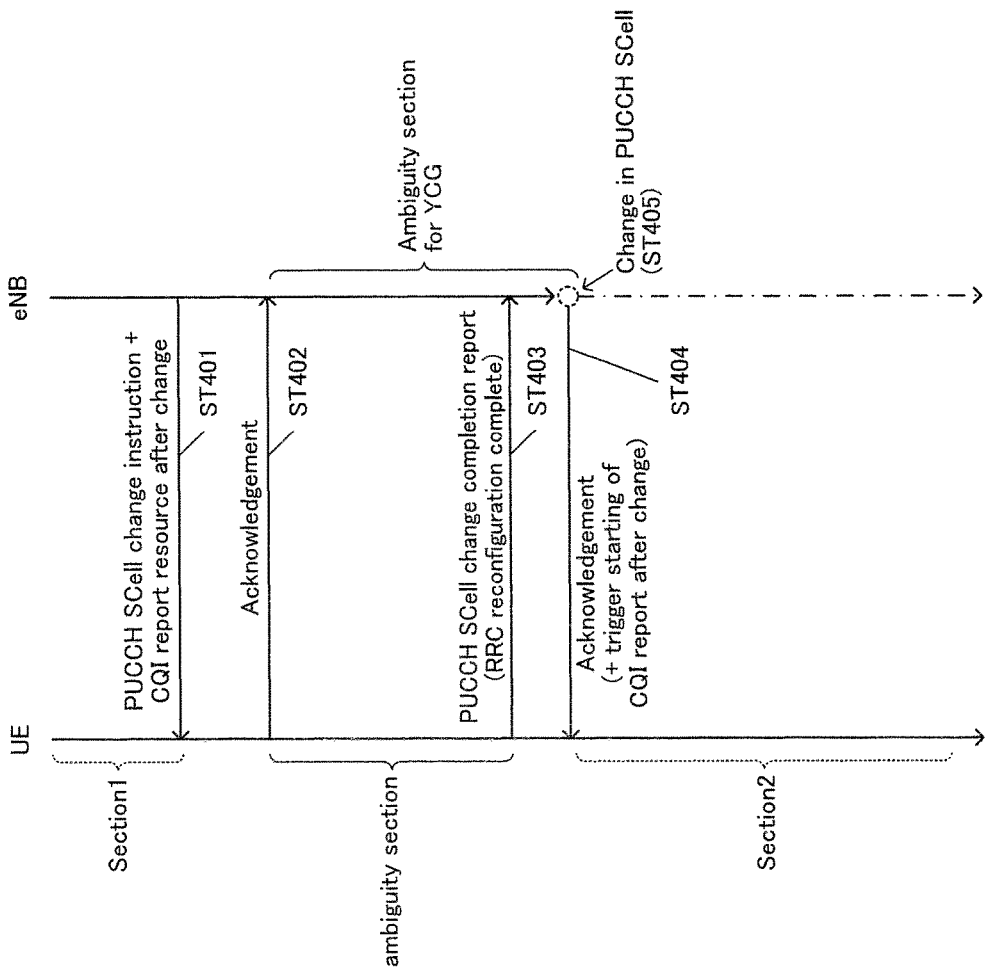
FIG. 14 is a sequence diagram illustrating the steps of changing in CQI report resource in carrier aggregation (CA) according to the second embodiment.

Then, description is made, with reference to FIG. 14, about an example of the steps of changing CQI report resources in carrier aggregation (CA).

As illustrated in FIG. 14, first, the radio base station eNB transmits, to the user terminal UE, an RRC message including a changed CQI report resource and a PUCCH SCell change instruction, and instructs RRC reconfiguration (ST401). That is, the radio base station eNB gives the user terminal UE the instruction of the changed CQI report resource in addition to the PUCCH SCell change instruction.

After receiving these instructions, the user terminal UE transmits ACK to the radio base station eNB (ST402) and stops transmission of the CQI report PUCCH before change.

The user terminal UE changes PUCCH SCells after receiving the RRC message until reporting a PUCCH SCell change completion. After change is completed, the user terminal transmits, to the radio base station eNB, RRC reconfiguration complete including the PUCCH SCell change completion report (ST403).

When receiving a change completion report, the radio base station eNB transmits ACK to the user terminal UE (ST404). Then, the radio base station eNB changes PUCCH SCells (ST405).

After changing the PUCCH SCells, the radio base station eNB triggers a CQI report start in a changed PUCCH SCell. Triggering may be performed using an RRC control signal, MAC CE, PDCCH (for example, Aperiodic CQI trigger) or the like. Triggering may be performed using the ACK of the PUCCH SCell change completion report itself. In such a case, CQI measurement can be started at the same time as acknowledgement of the PUCCH SCell change completion.

The user terminal UE starts CQI reporting in the changed PUCCH SCell.

As another example of carrier aggregation (CA), the radio base station eNB may receive the PUCCH SCell change completion report from the user terminal UE (ST403), transmit ACK of the report (ST404) and then, instruct to set a CQI report resource.

Figure 15:
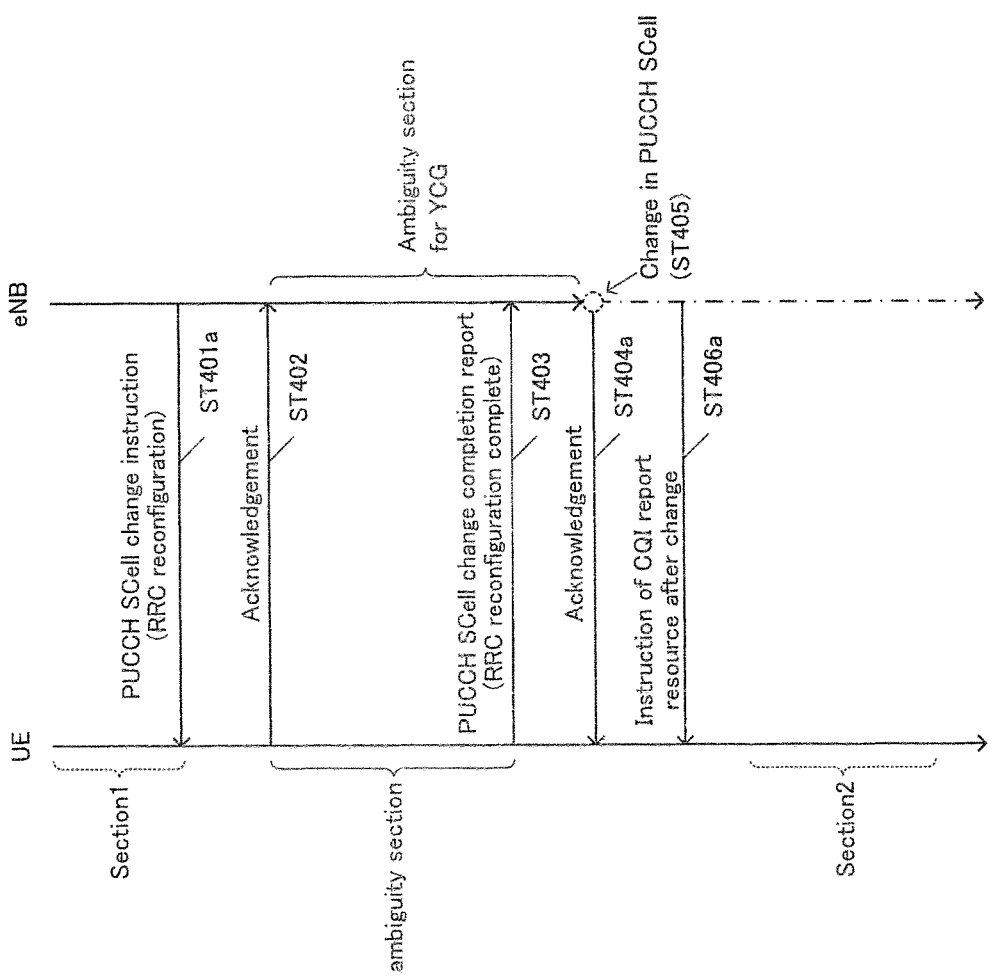
FIG. 15 is a sequence diagram illustrating the steps of changing in CQI report resource in carrier aggregation (CA) according to the second embodiment.

With reference to FIG. 15, description is made about another example of the steps of changing the CQI report resource in carrier aggregation (CA). In FIG. 15, the same steps as those in FIG. 14 are denoted by like reference numerals.

As illustrated in FIG. 15, first, the radio base station eNB transmits an RRC message including a PUCCH SCell change instruction to the user terminal UE and instructs RRC reconfiguration (ST401*a*). Upon receiving it, the user terminal UE transmits ACK to the user terminal UE (ST402) and stops transmission of CQI report PUCCH before change.

The user terminal UE changes PUCCH SCells after receiving the RRC message until reporting the PUCCH SCell change completion. After change is completed, the user terminal UE transmits RRC reconfiguration complete including a PUCCH SCell change completion report to the radio base station eNB ST403).

When receiving the change completion report, the radio base station eNB transmits ACK to the user terminal LIE (ST404*a*). Then, the radio base station eNB changes PUCCH SCells (ST405).

Then, the radio base station eNB reinstructs a CQI report resource to the user terminal UE (ST406*a*). The user terminal starts CQI reporting in the changed PUCCH SCell.

In the steps illustrated in FIG. 15, PUCCH resource for CQI is not reserved before starting the PUCCH SCell change processing, but the PUCCH resource for CQI is instructed after setting the changed PUCCH SCell. With this procedure, it is possible to allocate a CQI resource appropriately depending on the situation.

In the second embodiment, when changing PUCCH SCells, the changed SCell may be configured to be in a deactivate state inevitably. That is, the user terminal UE may be configured not to perform CQI reporting in the changed SCell until being instructed to change the SCell to the activate state by MAC CE.

Accordingly, the radio base station eNB has only to monitor CQI reporting in the SCell before change until the changed SCell is changed to the activate state by the active command of MAC CE before and after the PUCCH SCell change instruction.

Setting the changed SCell to the deactivate state may be performed by always setting the SCell to the deactivate state even without separate signaling or rule when there is a PUCCH SCell change instruction, or by multiplexing activation/deactivation MAC CE to instruct to set the deactivate state onto the RRC message. Or, the user terminal UE may come into the deactivate state autonomously by assuming the SCell deactivation time is completed. Or, it may be performed by SCell addition/removal.

Suppression of CQI report from the changed PUCCH SCell may be performed by controlling to assume a TA timer of Timing Advance group (TAG) to which the changed PUCCH SCell belongs is completed. This is based on the idea that in the serving cell of TAG such that TA timer is completed, uplink transmission other than random access (RA) preamble is inhibited.

(Configuration of Radio Communication System)

Next description is made about the configuration of the radio communication system according to the present embodiment. This radio communication system employs the radio communication method according to the first or second embodiment as described above.

Figure 16:
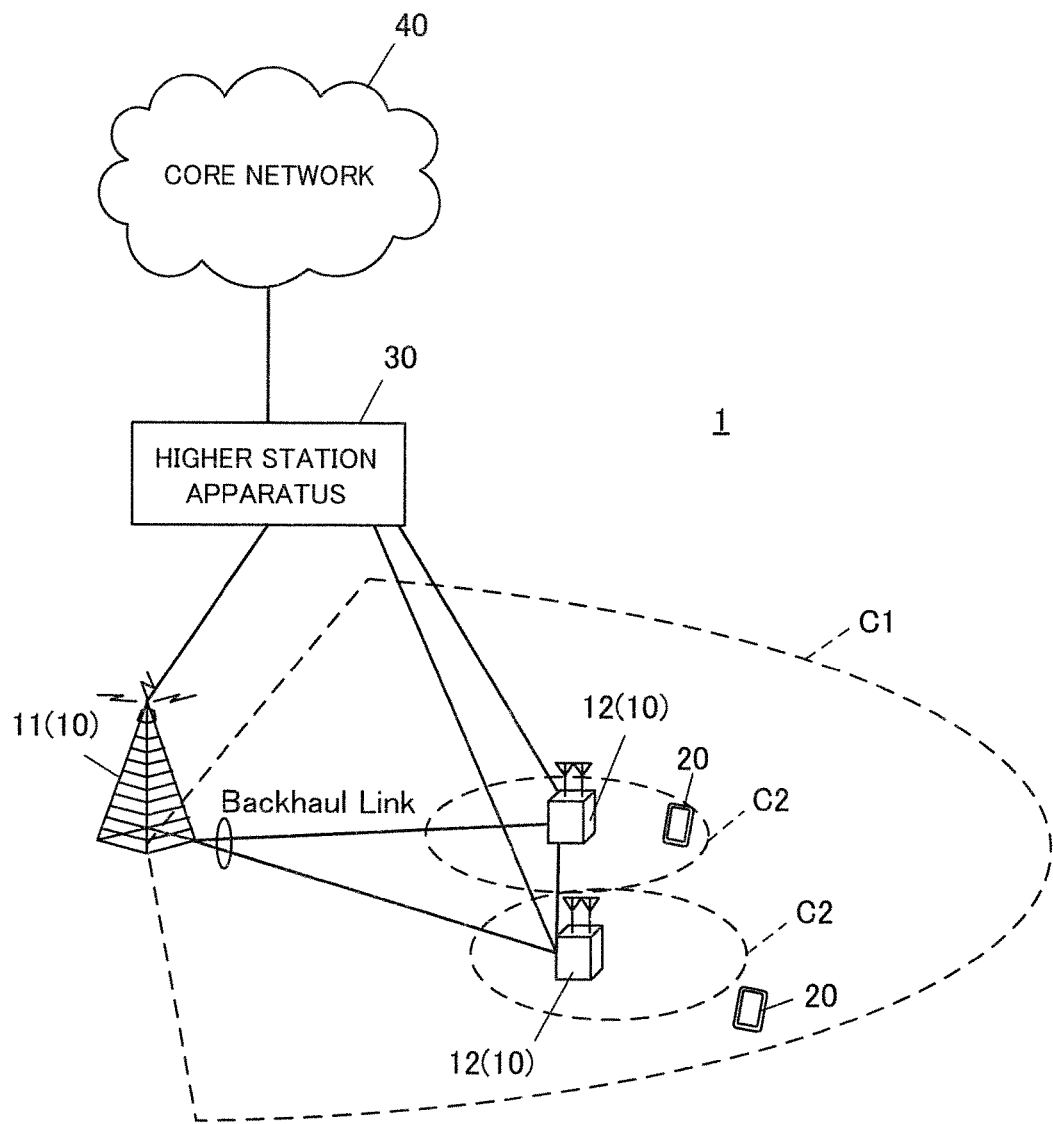
FIG. 16 is a diagram schematically illustrating an example of the configuration of a radio communication system according to the present embodiment.

FIG. 16 is a diagram schematically illustrating an example of a radio communication system according to the present embodiment. As illustrated in FIG. 16, the radio communication system 1 includes a plurality of radio base stations 10 (11 and 12) and a plurality of user terminals 20 that are located in cells formed by the radio base stations 10 and are configured to be able to communicate with the radio base stations 10. The radio base stations 10 are each connected to a higher station apparatus 30 and to a core network 40 via the higher station apparatus 30.

In FIG. 16, the radio base station is, for example, a macro base station having a relatively wide coverage and forms a macro cell C1. The radio base station 12 is a small base station having a local coverage and forms a small cell C2. The numbers of radio base stations 11 and 12 are not limited to those illustrated in FIG. 16.

The macro cell C2 and small cell C2 may use the same frequency band or use different frequency bands. In addition, the radio base stations and 12 are connected to each other via an inter-base station interface for example, an optical fiber or X2 interface).

Communication between the radio base stations 11 and 12, communication between radio base stations 11, and communication between radio base stations 12 are applied with dual connectivity (DC) or carrier aggregation (CA).

Each user terminal 20 is a terminal supporting various communication schemes such as LTE, LTE-A and on on, and may comprise a mobile communication terminal and a stationary communication terminal. The user terminal 20 is able to communicate with another user terminal via the radio base station 10.

The higher station apparatus 30 may be, for example, an access gateway apparatus, a radio network controller (RNC), a mobility management entity (MME) or the like, but is by no means limited to these.

In the radio communication system 1, downlink channels include a downlink shared channel (PDSCH: Physical Downlink Shared Channel), which is used by each user terminal 20 on a shared basis, a downlink control channel (PDCCH: Physical Downlink Control Channel, EPDCCH: Enhanced Physical Downlink Control Channel), a broadcast channel (PBCH) and so on. PDSCH is used to transmit user data, higher layer control information, given SIB (System Information Block). PDCCH and EPDCCH are used to transmit downlink control information (DCI).

In the radio communication system 1, uplink channels include an uplink shared channel (PUSCH: Physical Uplink Shared Channel), which is used by each user terminal 20 on a shared basis, an uplink control channel (PUCCH: Physical Uplink Control Channel), and so on. PUSCH is used to transmit user data and higher layer control information.

Figure 17:
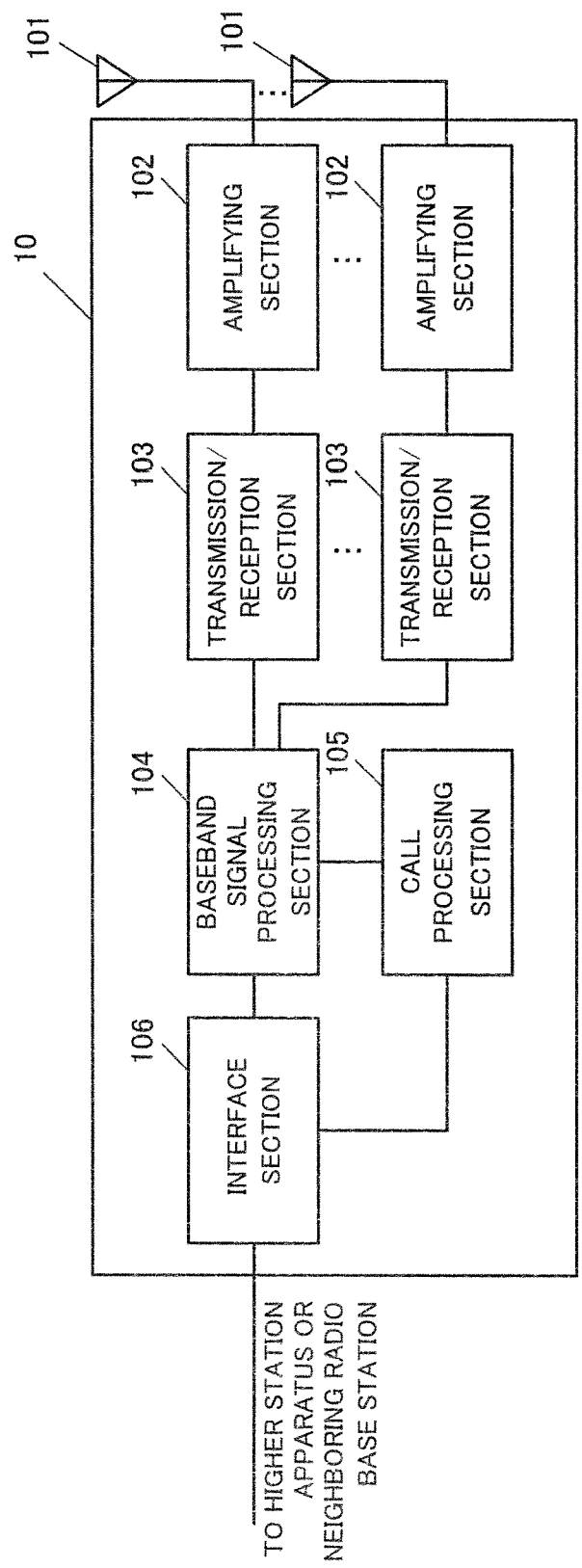
FIG. 17 is a diagram illustrating an example of the overall configuration of a radio base station according to the present embodiment.

FIG. 17 is a diagram illustrating an overall configuration of the radio base station 10 according to the present embodiment. The radio base station 10 has a plurality of transmission/reception antennas 101 for MIMO transmission, amplifying sections 102, transmission/reception sections 103, a baseband signal processing sec on 104, a call processing sect on 105 and an interface section 106.

User data to be transmitted from the radio base station 10 to a user terminal 20 on downlink is input from the higher station apparatus 30, into the baseband signal processing section 104, via the interface section 106.

In the baseband signal processing section 104, a PDCP layer process, division and coupling of user data, RLC (Radio Link Control) layer transmission processes including an RLC retransmission control transmission process, MAC (Medium Access Control) retransmission control, such as an HARQ (Hybrid ARQ) transmission process), scheduling, transport format selection, channel coding, an inverse fast Fourier transform (IFFT) process and a precoding process are performed, and the resultant is forwarded to each transmission/reception section 103. Furthermore, down link control signals are also subjected to transmission processes such as channel coding and an inverse fast Fourier transform, and are forwarded to each transmission/reception section 103.

Each transmission/reception section 103 converts downlink signals that are pre-coded and output from the baseband signal processing section 104 on a per antenna basis, into radio frequency band. The amplifying sections 102 amplify the radio frequency signals having been subjected to frequency conversion, and the resultant signals are transmitted through the transmission/reception antennas 101.

On the other hand, as for uplink signals, radio frequency signals are received in the transmission/reception antennas 101, are amplified in the amplifying sections 102, are frequency-converted into baseband signals in the transmission/reception sections 103, and then input to the baseband signal processing section 104.

Each transmission/reception section 103 transmits radio resource control (RRC) messages and receives PUCCH from a PUCCH cell.

In the baseband signal processing section 104, user data included in the input uplink signal is subjected to a fast Fourier transform (FFT) process, an inverse discrete Fourier transform (IDFT) process, error correction decoding, a MAC retransmission control receiving process, and RLC layer and PDCP layer receiving processes, and the resultant is forwarded to the higher station apparatus 30 via the communication path interface 106. The call processing section 105 performs call processing such as setting up and releasing communication channels, manages the state of the radio base station 10 and manages the radio resources.

The interface section performs transmission and reception of signals with neighboring radio base stations through an inter-base station interface (for example, optical fiber, X2 interface). Or, the interface section 106 performs transmission and reception of signals with the higher station apparatus 30 through a given interface.

Figure 18:
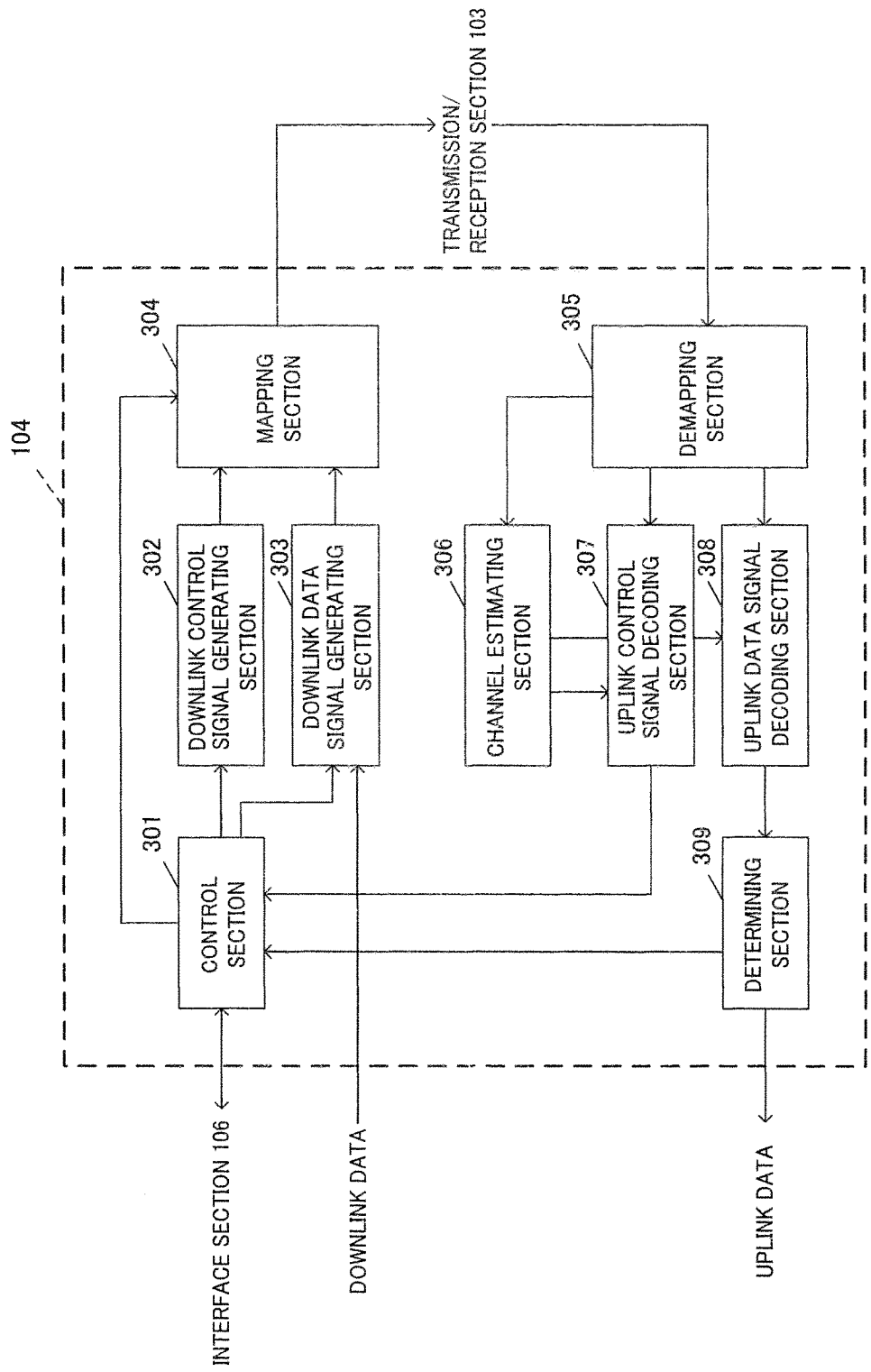
FIG. 18 is a diagram illustrating an example of the functional structure of the radio base station according to the present embodiment.

FIG. 18 is a diagram illustrating a principal functional structure of the baseband signal processing section 104 provided in the radio base station 10 according to the present embodiment. As illustrated in FIG. 18, the baseband signal processing section 104 provided in the radio base station 10 has at least a control section 301, a downlink control signal generating section 302, a downlink data signal generating section 303, a mapping section 304, a demapping section 305, a channel estimating section 306, an uplink control signal decoding section 307, an uplink data signal decoding section 308 and a determining section 309.

The control section 301 controls scheduling of downlink reference signals, downlink control information to be transmitted in both or either of PDCCH and enhanced PDCCH (EPDCCH) and user data to be transmitted in PDSCH. In addition, the control section 301 also controls scheduling of RA preamble to be transmission in PRACH, uplink data to be transmitted in PUSCH, uplink control information to be transmitted in PUCCH or PUSCH, and uplink reference signals (allocation control). Information about allocation control of uplink signals (uplink control signals and uplink user data) is given to the user terminal 20 by using downlink control information (DCI).

The control section 301 controls allocation of radio resources to uplink signals and downlink signals based on feedback information from each user terminal 20 and instruction information from the higher station apparatus 30. That is, the control section 301 has a scheduler function.

The control section 301 controls to transmit an RRC message including a PUCCH cell change instruction and also controls not to perform downlink scheduling until receiving a completion report in response to the RRC message. Instead of controlling not to perform downlink scheduling, the control section 301 may transmit an RRC message including a PUCCH cell change instruction and monitor an uplink control signal in both of a PUCCH cell before change and a changed PUCCH cell until receiving a completion report in response to the RRC message.

The downlink control signal generating section 302 generates downlink control signals (both or either of PDCCH signal and EPDCCH signal) that are determined to be allocated by the control section 301. Specifically, the downlink control signal generating section 302 generates downlink assignment to give assignment information of downlink signals and uplink rant to give assignment information of uplink signals.

The downlink data signal generating section 303 generates downlink data signals (PDSCH signals) that are determined to be allocated to resources by the control section 301. The data signals generated by the downlink data signal generating section 303 are subjected to the coding and modulation processes in accordance with a coding rate and a modulation scheme that are determined based on CSI from each user terminal 20 and so on.

The mapping section 304 controls allocation of downlink control signals generated by the downlink control signal generating section 302 and downlink data signals generated by the downlink data signal generating section 303 to radio resources based on the instruction from the control section 301.

The demapping section 305 demaps an uplink signal that is transmitted from the user terminal 20 and separates the uplink signal. The channel estimating section 306 estimates a channel state from a reference signal included in the reception signal separated in the demapping section 305 and output an estimated channel state to the uplink control signal decoding section 307 and uplink data signal decoding section 308.

The uplink control signal decoding section 307 decodes feedback signals (transmission acknowledgement signals or the like) transmitted from the user terminal in uplink control channels (PRACH, PUCCH) and output the resultant signals to the control section 301. The uplink data signal decoding section 308 decodes uplink data signals transmitted from the user terminal in the uplink shared channel (PUSCH) and outputs them to the determining section 309. The determining section 309 performs retransmission control determination (A/N determination) based on a decoding result in the uplink data signal decoding section 308 and outputs a resultant to the control section 301.

Figure 19:
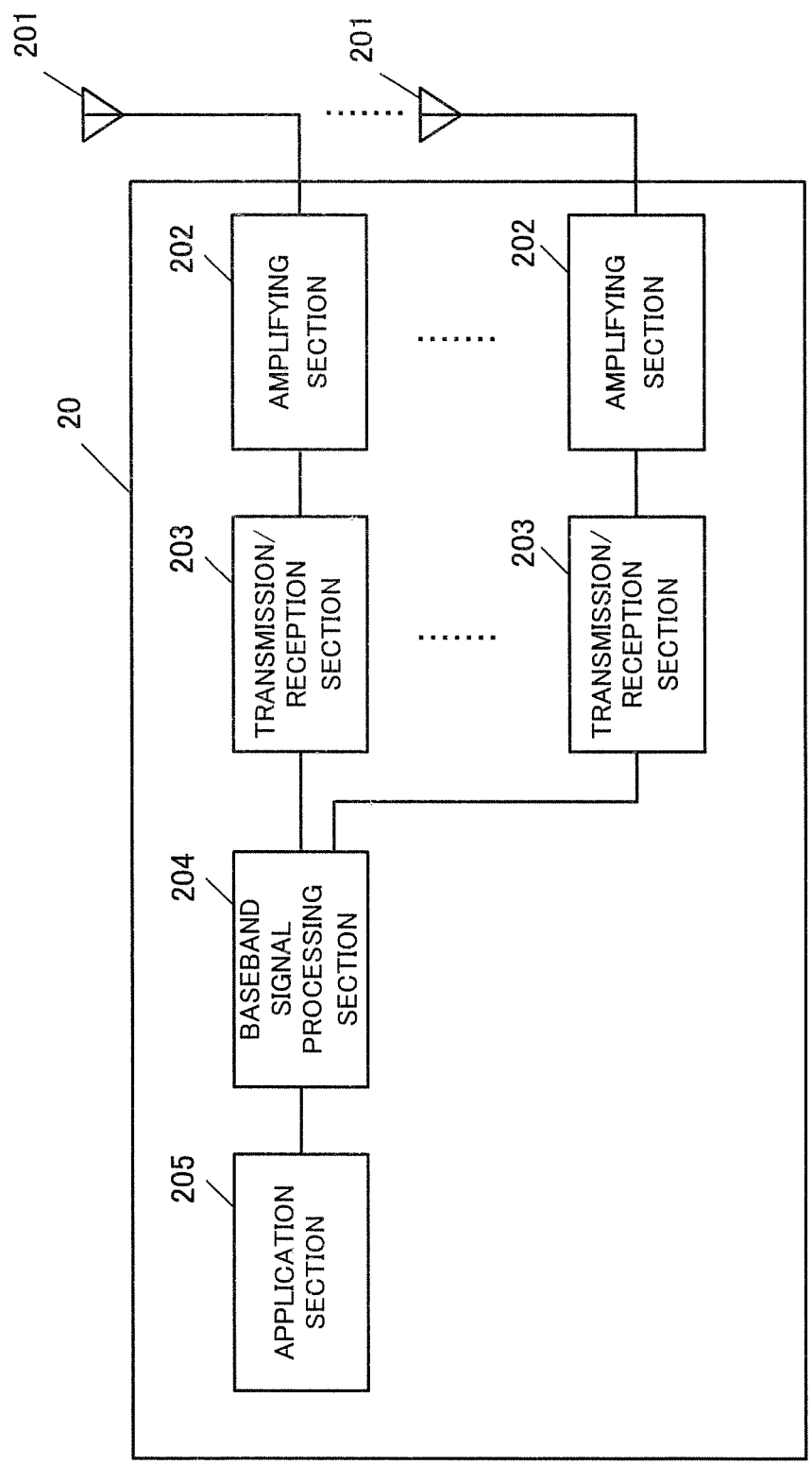
FIG. 19 is a diagram illustrating an example of the overall configuration of a user terminal according to the present embodiment.

FIG. 19 is a diagram illustrating an overall structure of a user terminal 20 according to the present embodiment. As illustrated in FIG. 19, the user terminal 20 has a plurality of transmission/reception antennas 201 for MIMO transmission, amplifying sections 202, transmission/reception sections (reception sections) 203, a baseband signal processing section 204 and an application section 205.

As for downlink data, radio frequency signals are received in the plurality of transmission/reception antennas 201, are amplified in the amplifying sections 202, and are subjected to frequency conversion and converted into baseband signals in the transmission/reception sections 203. These baseband signals are subjected to an FFT process, error correction decoding, a retransmission control receiving process and so on in the baseband signal processing section 204. In this downlink data, downlink user data is forwarded to the application section 205. The application section 205 performs processes related to higher layers above the physical layer and the MAC layer. Furthermore, in the downlink data, broadcast information is also forwarded to the application section 205.

Meanwhile, up ink user data is input from the application section 205 to the baseband signal processing section 204. In the baseband signal processing section 204, retransmission control (HARQ (Hybrid ARQ) transmission process), channel coding, precoding, a discrete Fourier transform (DFT) process, an IFFT process and so on are performed, and the resultant is forwarded to each transmission/reception section 203. The baseband signal that is output from the baseband signal processing section 204 is converted into a radio frequency band in the transmission/reception sections 203. After that, the amplifying sections 202 amplify radio frequency signals having been subjected to frequency conversion, and the resulting signals are transmitted from the transmission/reception antennas 201.

The transmission/reception sections 203 receive RRC messages and transmit HARQ-ACKs.

Figure 20:
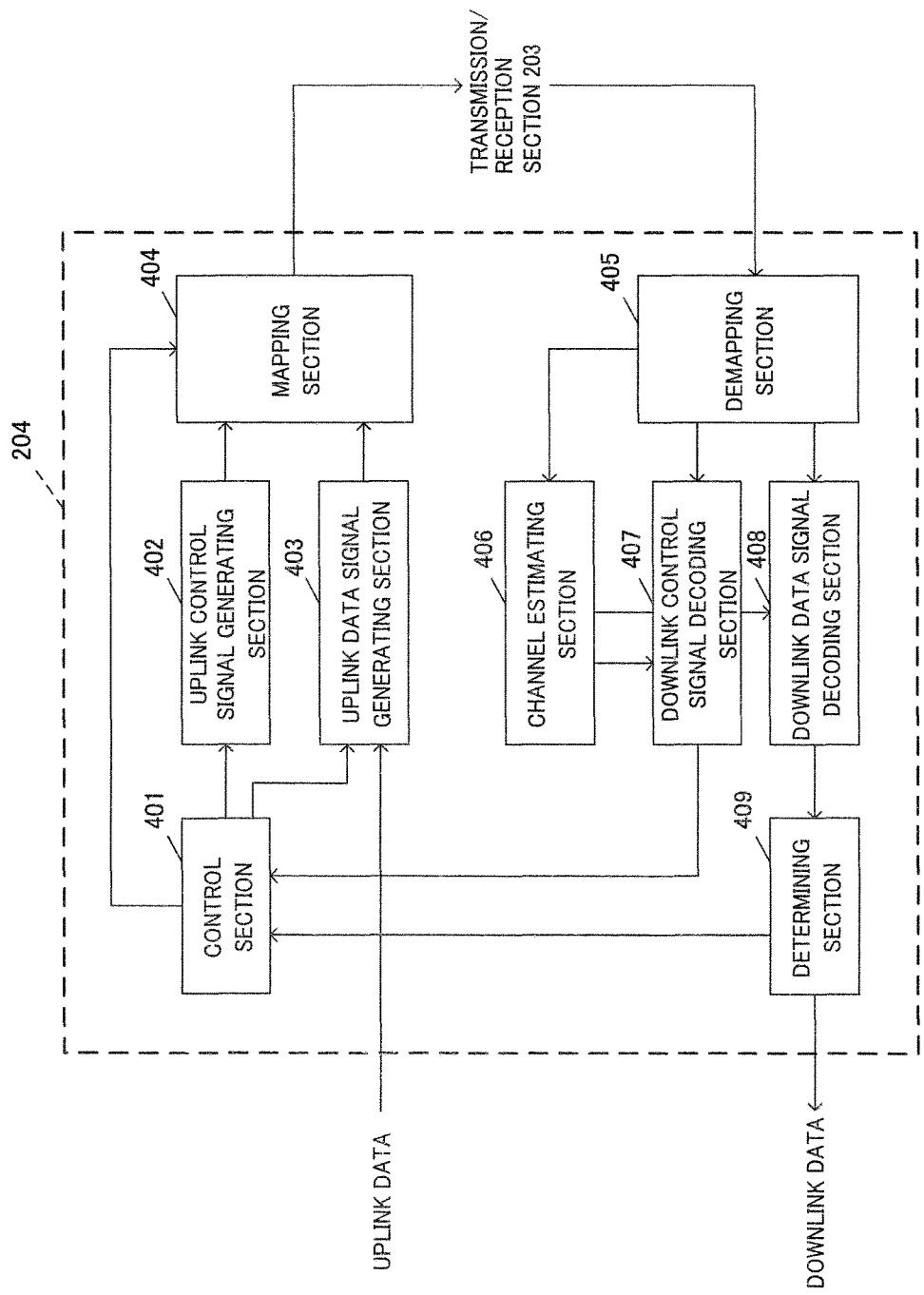
FIG. 20 is a diagram illustrating an example of the functional structure of the user terminal according to the present embodiment.

FIG. 20 is a diagram illustrating a principal structure of the baseband signal processing section 204 provided in the use terminal 20. As illustrated in FIG. 20, the baseband signal processing section of the user terminal 20 is configured to have at least a control section 401, an uplink control signal generating section 402, an uplink data signal generating section 403, a mapping section 404, a demapping section 405, a channel estimating section 406, a downlink control signal decoding section 407, a downlink data signal decoding section 408 and a determining section 409.

The control section 401 controls generation of uplink control signals (A/N signals and so on) and uplink data signals based on downlink control signals (PDCCH signals) transmitted from the radio base station 10 and retransmission control determination results in response to received PDSCH signals. The downlink control signals received from the radio base station are output from the downlink control signal decoding section 407 and the retransmission control determination results are output from the determining section 409.

The control section 401 selects at least one cell from PUCCH cells that are set for each cell group and controls it as a cell for PUCCH transmission and when a received RRC message includes a PUCCH cell change instruction, the control section 401 controls HARQ-ACK in response to the RRC message to be transmitted in a PUCCH cell before change. When the RRC message includes a PUCCH cell change instruction, the control section 401 stops channel quality information (CQI) reporting in the PUCCH cell before change.

The uplink control signal generating section 402 generates uplink control signals (feedback signals including transmission acknowledgement signals and channel sate information (CSI)) based on the instruction from the control section 401. The uplink data signal generating section 403 generates uplink data signals based on the instruction from the control section 401. The control section 401 instructs the uplink data signal generating section 403 to generate an uplink data signal when a downlink control signal given from the radio base station includes an uplink grant.

The mapping section 404 controls mapping of uplink control signals (transmission acknowledgement signals and so on) and uplink data signals to radio resources (PUCCH, PUSCH) based on an instruction from the control section 401.

The demapping section 405 demaps a downlink signal transmitted from the radio base station 10 and separates the downlink signal. The channel estimating section 406 estimates a channel state from a reference signal included in a reception signal separated by the demapping section 405 and outputs the estimate channel state to downlink control signal decoding section 407 and downlink data signal decoding section 408.

The downlink control signal decoding section 407 decodes downlink control signals (PUCCH signals) transmitted in a downlink control channel (PDCCH) and outputs scheduling information (allocation information to uplink resources) to the control section 401. The downlink control signal decoding section 407 also outputs the downlink control signal to the control section 401 even when the downlink control signal includes information about a cell to feed back a transmission acknowledgement signal and information about whether to apply RF adjustment or not.

The downlink data signal decoding section 408 decodes a downlink data signal transmitted in the downlink shared channel (PDSCH) and outputs it to the determining section 409. The determining section 409 performs retransmission control determination (A/N determination) based on ad decoding result of the downlink data signal decoding section 408 and outputs its resultant to the control section 401.

The present invention is not limited to the above-described embodiment and can be embodied in various modified or altered forms. In the above-described embodiments, the size and shape illustrated in the accompanying drawings are not intended to limit the present invention and may be modified as far as the effects of the present invention can be exerted. Other modifications are also possible without departing from the scope of the present invention.

The disclosure of Japanese Patent Application No. 2013-269757, filed on Dec. 26, 2013, including the specification, drawings, and abstract, is incorporated herein by reference in its entirety.

The invention claimed is:

1. A user terminal that communicates with use of a plurality of physical uplink control channel (PUCCH) cells, the user terminal comprising:
   a receiver that receives a radio resource control (RRC) message including a PUCCH secondary cell (SCell) change instruction which includes information on a changed scheduling request (SR) report resource after the PUCCH SCell change;
   a processor that changes at least one PUCCH SCell based on the RRC message; and
   a transmitter that transmits transmission acknowledgement information (HARQ-ACK: Hybrid Automatic Repeat reQuest-ACKnowledgement) in response to the RRC message by using a PUCCH transmission setting before the PUCCH SCell change,
   wherein after receiving the RRC message, the processor stops SR transmission in a PUCCH SCell before the PUCCH SCell change.

2. The user terminal according to claim 1, wherein when the user terminal communicates using dual connectivity, the receiver receives the RRC message in a cell belonging to a master cell group, and the transmitter transmits the HARQ-ACK for the RRC message in a primary cell (PCell).

3. The user terminal according to claim 1, wherein when the user terminal communicates using carrier aggregation, the receiver receives the RRC message in any cell and the transmitter transmits the HARQ-ACK for the RRC message in the PUCCH SCell before the PUCCH SCell change.

4. A radio communication method for a user terminal communicating with use of a plurality of physical uplink control channel (PUCCH) cells, the radio communication method comprising:
   receiving a radio resource control (RRC) message including a PUCCH secondary cell (SCell) change instruction which includes information on a changed scheduling request (SR) report resource after the PUCCH SCell change;
   changing at least one PUCCH SCell based on the RRC message; and
   transmitting transmission acknowledgement information (HARQ-ACK: Hybrid Automatic Repeat reQuest-ACKnowledgement) in response to the RRC message by using a PUCCH transmission setting before the PUCCH SCell change,
   wherein after receiving the RRC message, the processor stops SR transmission in a PUCCH SCell before the PUCCH SCell change.

* * * * *